(12) United States Patent
Matsunaga et al.

(10) Patent No.: US 7,264,411 B2
(45) Date of Patent: Sep. 4, 2007

(54) PRINT SYSTEM, PRINT DEVICE AND PRINT INSTRUCTION METHOD

(75) Inventors: Shigeki Matsunaga, Kadoma (JP); Kazuyuki Murata, Kyotanabe (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 328 days.

(21) Appl. No.: 10/524,584

(22) PCT Filed: Nov. 6, 2003

(86) PCT No.: PCT/JP03/14131

§ 371 (c)(1),
(2), (4) Date: Feb. 15, 2005

(87) PCT Pub. No.: WO2004/042550

PCT Pub. Date: May 21, 2004

(65) Prior Publication Data

US 2006/0165456 A1   Jul. 27, 2006

(30) Foreign Application Priority Data

Nov. 6, 2002   (JP) .............................. 2002-322249

(51) Int. Cl.
*B41J 5/30*   (2006.01)
(52) U.S. Cl. ........................... 400/62; 400/61; 358/1.15
(58) Field of Classification Search ................... 400/62; 358/1.15
See application file for complete search history.

(56) References Cited

U.S. PATENT DOCUMENTS 7,130,066 B1 * 10/2006 Kanematu .................. 358/1.15

2002/0099936 A1 * 7/2002 Kou et al. .................. 713/151

FOREIGN PATENT DOCUMENTS

| JP | 2001-228986 | 8/2001 |
|---|---|---|
| JP | 2002-091857 | 3/2002 |
| JP | 2002-259108 | 9/2002 |
| WO | 02/45370 | 6/2002 |

OTHER PUBLICATIONS

O. Larsson et al., "Basic Printing Profile", Interoperability Specification (Draft), Revision 0.95a (pp. 57-58), Oct. 5, 2001, (online ), The Bluetooth SIG, Inc., Oct. 25, 2002 (access date), URLhttp://www.bluetooth.org/docs/BPP_0_95a.pdf.

T. Dierks et al., "Request for Comments: 2246, The TLS Protocol Version 1.0," Jan. 1999 (online), The Internet Engineering Task Force (access date) Oct. 25, 2002, URLhttp://www.ietf.org/rfc/rfc2245.txt.

* cited by examiner

*Primary Examiner*—Minh Chau
(74) *Attorney, Agent, or Firm*—Wenderoth, Lind & Ponack, L.L.P.

(57) ABSTRACT

A print system (0001) includes a print instruction device (0101), a print device (0102) and a print data supply device (0103). The print instruction device (0101) has a print instruction device (0111) which transmits, to the print device (0102), authentication information and a print instruction of print data in a print data supply device (0103). The print device (0102) has a print data requesting unit (0112) which transmits the authentication information according to the print instruction to the print data supply device (0103) and requests a transmission of print data, and a print data receiving unit (0113) which receives the print data from the print data supply device (0103).

17 Claims, 11 Drawing Sheets

FIG. 5A

| | |
|---|---|
| Position Information | :http://www.pana.com/document.html |
| Format | :XHTML-Print |
| | |
| Number of Copies | :1 |
| Quality | :Standard |
| Paper Size | :A4 |
| Paper Direction | :Vertical |
| Side | :One Side |
| Paper Type | :Plain Paper |
| Color | :Black and White |
| ..... | : ..... |

FIG. 5B

| | |
|---|---|
| Position Information | :http://www.pana.com/document.html |
| Format | :XHTML-Print |
| | |
| Number of Copies | :1 |
| Quality | :Standard |
| Paper Size | :A4 |
| Paper Direction | :Vertical |
| Side | :One Side |
| Paper Type | :Plain Paper |
| Color | :Black and White |
| ..... | : ..... |
| | |
| Authentication Information | :ID :Matsushita Taro |
| | PASS:password |

PRINT SYSTEM, PRINT DEVICE AND PRINT INSTRUCTION METHOD

TECHNICAL FIELD

The present invention relates to a method of instructing a print device to print print data, in particular to a print system and a print device which receives the print instruction in the case where print data through a communication path needs to be protected, when the print device receives print data directly from a supplier of the print data.

BACKGROUND ART

According to recent rapid expansion of broadband environment, a distribution service such as a music distribution service and a moving picture distribution service with which a user can receive and reproduce contents from a service server on the Internet has been widely available. It is expected that such distribution service will be applied to print content from now on and developing to a print content distribution service in which print content is distributed from a server on the Internet to each terminal.

An existing print device such as an inkjet printer is connected only to a control device such as a personal computer (PC) via a Universal Serial Bus (USB), a parallel bus or the like and operates as a slave device of the control device. In the existing print system in which the print device is the slave device, the print device does not directly obtain print content on a device other than the control device.

Consequently, when the print content distribution system is applied to the existing print system, it becomes a print system in which the control device (PC, Set Top Box (STB), cellular phone, etc) firstly receives the print content and the print content is transferred and printed in the print device. In this case, the control device needs to bypass the print content so that it causes an increase of processing loads and network loads on the control device.

On the other hand, following a recent introduction of an Internet Protocol version 6 (IPv6) which widely expands an address space, development of products such as home appliances and car navigation systems having a function of network connection has been promoted. As for the print device, conventionally a part of the print device for office use had the function of network connection. However, in consequence with the prevalence of the IPv6, it is expected that the time for the print device to commonly have the function of network connection will come.

Thus, when the print device has a network communication function, in the print content distribution service, it is most applicable to have a system configuration in which the print device receives content directly from the service server based on a print instruction transmitted from the control device (PC, STB, cellular phone) in order to reduce workloads of the control device (e.g. refer to Olof Larsson, et al., "BASIC PRINTING PROFILE" Interoperability Specification (Draft), Revision 0.95a (pp. 57-58), Oct. 5, 2001, (online) The Bluetooth SIG, Inc., Oct. 25, 2002 (access date), URL: http://www.bluetooth.org/docs/BPP_0_95a.pdf). With reference to FIG. 1, this print system is explained.

FIG. 1 is a block diagram showing a configuration of a conventional print system. It shows an example that the conventional print system is a print system which is constituted of three devices including a control device 0001, a print device 0002 and a service server 0003, in which a digital television which is the control device 0001 and a print device 0002 are connected via IEEE 1394. Also, the print device 0002 and the service server 0003 are connected via the internet 0005.

At an initial state, the service server 0003 holds print content that can be specified by a Uniform Resource Locator (URL) (A). The control device 0001 receives an instruction from a user, notifies the print device 0002 of URL(A) which is a URL of the print content and instructs to print the print content at the URL(A) (FIG. 1 (1)). The print device 0002 which received the print instruction accesses the service server 0003 based on the URL(A) and requests the print content (FIG. 1 (2)). The service server 0003 transmits the print content that can be specified by the URL(A) to the print device 0002 (FIG. 1 (3)). When the print device 0002 finishes printing the print content received from the service server 0003 (FIG. 1 (4)), it notifies the control device 0001 of the end of the printing (FIG. 1 (5)).

As described above, in this system, the control device 0001 does not need to bypass the print content so that it only transmits a print instruction and waits for the completion notice. The print device 0002 receives the print content directly from the service server 0003 and prints the content. Thus, there is no bypass of the print content by the control device so that the workloads on the control device 0001 are reduced as well as the network workloads.

Here, when a distribution of charged content is realized in the system configuration shown in FIG. 1, the charged content transmitting between the service server 0003 and the print device 0002 passes through the Internet 0005. Therefore, the charged content faces dangers such as an illegal access to the service server 0003 and a tapping of the content by a malicious third party. Consequently, it is necessary to establish a secure communication path between a separate service server 0003 and the print device 0002 in order to protect the content. Specifically, following functions are necessary such an authentication function for managing access to content in order to realize a charging and the like, and a communication path encryption function for protecting the content transmitting through the communication path and authentication information which requires secrecy from being leaked to the third party.

As the secure communication paths using the conventional technology, there are a Secure Socket Layer (SSL) and a Transport Layer Security (TLS) (e.g. refer to T. Dierks and C. Allen, "Request for Comments: 2246, The TLS Protocol Version 1.0," January 1999 (online), The Internet Engineering Task Force, (access date) Oct. 25, 2002, URL: http://www.ietf.org/rfc/rfc2246.txt). The SSL is a communication path encryption technology proposed by Netscape Communications Corporation based on a public key encryption method. It is a technology used widely in data communication such as HTTP and FTP on the Internet. Also, the TLS is a technology which added a few improvements to the SSL as a base.

Furthermore, as an authentication technology, conventionally an authentication technology using authentication information composed of a pair of a user ID and a password is known in general. Specifically, a user registers in advance the authentication information composed of a pair of a user ID and a password at the service server. The terminal device such as PC or DTV at the user side transmits the registered authentication information to the service server in order to access charged content managed in the service server. The service server verifies the authentication information sent from the user with the registered authentication information, recognizes the user as an authorized contract user, and permits the user to access the content when both of the pieces of information match one another as the result of the verification. On the other hand, when the information pieces do not match one another as the result of the verification, the service server transmits to the user an indication that the sent authentication information does not match with the registered authentication information, and refuses to allow the user to access the content. Accordingly, access to content by an unauthorized user who does not know the authentication information registered at the service server can be prevented. In addition, a user ID or a device ID (e.g. ID of DTV) included in the authentication information can be cheated by anyone if the person knows the ID so that the unitary use of the information is insufficient as the authentication information. However, it is used for the purpose of easily specifying one who accesses the server. For example, the service server extracts the user ID or the device ID from the authentication information and specifies the user or the device and performs a process such as charging the access to the content after the authentication with the authentication information composed of a pair of an ID and a password.

However, at this moment, there is no print system or print device that can instruct to obtain the print content (data) using a communication path by establishing the secure communication path between the print device and the service server by the printer.

DISCLOSURE OF INVENTION

In order to solve the mentioned problem, it is an object of the present invention to provide, in the case where a print device obtains print data via a communication network (pull-printer), a print system, print device and a print instruction method that are capable of preventing a leakage of the charged content (print data) and the authentication information through the communication network.

A print system according to the present invention is for printing print data provided from a print data supply device to a registered user or device that is authorized to access print data, the system comprising a print instruction device and a print device, wherein the print instruction device includes a print instruction unit operable to transmit, to the print device, a print instruction to print the print data in the print data supply device, with authentication information given only to the user or the device, and the print device includes: a data requesting unit operable to transmit the authentication information with the print instruction to the print data supply device and request the print data supply device to transmit the print data; and a data receiving unit operable to receive the print data from the print data supply device.

Also, a print device according to the present invention in a print system is for printing print data provided from a print data supply device to a registered user or device that is authorized to access the print data, the print system comprising a print instruction device and a print device, the print device including: a data requesting unit operable to i) receive a print instruction to print the print data in the print data supply device with authentication information given only to the user or the device by the print instruction device, ii) transmit the authentication information according to the print instruction to the print data supply device, and iii) request to transmit the print data, and a data receiving unit operable to receive the print data from the print data supply device.

Further, in the print device, the data receiving unit may include an encrypted data receiving unit operable to receive the encrypted print data; and a print data decrypting unit operable to decrypt the received print data using the authentication information.

Furthermore, the authentication information may include a decryption key which is data for decrypting the encrypted print data.

As described in the above, according to the present invention, the encrypted print data can be transmitted and received by a communication path between the print device and the print data supply device so that the leakage of the print data in the communication path can be prevented.

Also, the print data supply device may include: a request receiving unit operable to receive a request of a transmission of print data and authentication information corresponding to the print data; a user identifying unit operable to identify the print instruction device or the user using the received authentication information; an authenticating unit operable to verify whether or not the identified print instruction device or the identified user has been authorized to access the requested print data; and a data transmitting unit operable to, when the access is permitted as the result of the authentication, newly issue authentication information that can be used continuously by the print device and transmit the requested print data to the print device.

Further, the authentication information may include information for identifying the print instruction device or information for identifying a user of the print system.

As described in the above, according to the present invention, the print data supply device can identify a print instruction device or a user of the print system so that unauthorized access to the print data can be prevented.

In particular, in the case where a SSL or a TSL that are described later are established between the print device and the print data supply device using the authentication information, both of the leakage of the print data in the communication path and unauthorized access to the print data can be prevented.

Thus, the present invention can embody a print instruction method and a printer device which can establish a secure communication between a service server and a printer and instruct so as to obtain print content (data) using the established communication path.

BRIEF DESCRIPTION OF DRAWINGS

FIG. 5A is a diagram showing an example of existing print instruction information.

FIG. 5B is a diagram showing an example in the case where print instruction information also includes authentication information.

DETAILED DESCRIPTION OF THE INVENTION

Hereafter, it is explained in detail about a print system according to the embodiment of the present invention with reference to the drawings.

Figure 2:
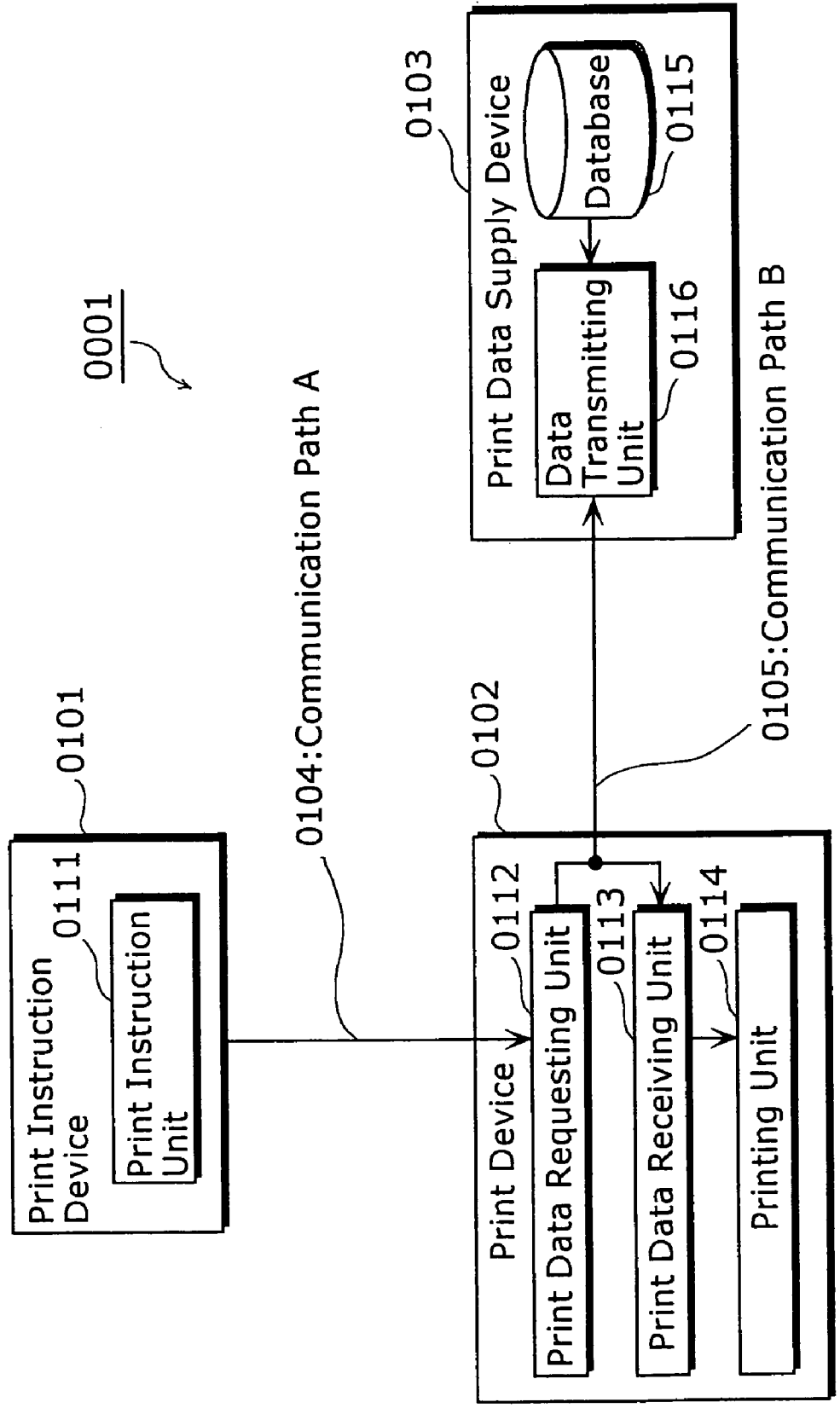
FIG. 2 is a diagram showing a configuration of a print system in an embodiment of the present invention.

FIG. 2 is a diagram showing a system configuration of the print system in the present embodiment. This system model is constituted of a print instruction device 0101, a print device (printer device) 0102 and a print data supply device 0103. Respectively, the print instruction device 0101 and the print device 0102 are connected by a communication path A: 0104, and the print device 0102 and the print data supply device 0103 are connected by a communication path B: 0105. The print system 0001 according to the present invention does not have particular characteristics as a system model. However, it finds characteristics in a method of instructing printing from the print instruction device to the print device and in a procedure for the print device to obtain print data from the print data supply device using the print instruction method.

Hereafter, it is explained about each constituent of the print system 0001.

The print instruction device 0101 is a device having a print instruction unit 0111 which performs a command control such as an instruction for printing on the print device (printer device) 0102. For example, it applies to a Personal Computer (PC), a Digital Television (DTV), a cellular phone, a Digital Versatile Disc (DVD) recorder, a Hard Disk Drive (HDD) recorder, an Audio Visual (AV) server, a remote controller and the like. Any other devices that can issue a command to other devices may be applied. The print instruction device 0101 and the print device 0102 are connected via the communication path A: 0104 and the command control is performed via the communication path A: 0104. As an example of the communication path A, for example, there is the Internet (Ethernet (R), 802.11b, etc.) including Local Area Network (LAN), IEEE 1394 and Bluetooth.

The print device 01021 includes a print data requesting unit 0112 which requests to transmit the print data in the print data supply device 0103, a print data receiving unit 0113 which receives the print data transmitted from the print data supply device 0103, based on the instruction from the print instruction device 0101 and a printing unit 0114 which prints the received print data. It applies to a print device such as an inkjet print device and a laser print device, a facsimile (FAX), and Multi Function Peripherals (MFP). The print device 0102 and the print instruction device 0101 are connected via the communication path A as described above. On the other hand, the print device 0102 and the print data supply device 0103 are connected via the communication path B: 0105, and the control command from the print device 0102 to the print data supply device 0103 and print data from the print data supply device 0103 to the print device 0103 are transferred via the communication path B: 0105. As an example of the communication path B, similar to the communication path A, there is the Internet such as LAN, IEEE1394, Bluetooth and the like.

The print data supply device 0103 is a device including a database 0115 that holds print data and a data transmitting unit 0116 which, based on a request from the print device 0102, reads print data from the database 0115 and transmits to the print device 0102. For example, it applies to a server on the Internet, a PC, a digital still camera (DSC), an AV server, a DVD recorder, a HDD recorder and the like. Any other devices that can supply data to other appliances may be applied. It is connected to the print device 0102 through the communication path B: 0105.

In the above, each constituent is explained. In the present embodiment, it is explained referring the print instruction device 0101 as a DTV, the print device as a printer and the print data supply device as a server on the Internet. However, this is just an example of the present invention and does not limit the range of the present invention. For example, a service provided by the print data supply device 0103 is referred to as a print data distribution. However, it can be a music distribution, an image distribution, a video distribution and the like. For example, in the case of the music distribution, the print device 0102 applies to a music reproduction device, the print data supply device 0103 applies to a music distribution server, and the print instruction device 0101 applies to a device which command-controls the music reproduction device. Whereas it is needless to say that a function of the print device 0102 of the present invention is not limited only to displaying the print data for the user, the print device 0102 can be a device which not only displays data received from the print data supply device 0103 but also stores the data. For example, in the case where a service provided by the print data supply device 0103 is an image distribution instead of the print data distribution, the print device 0103 applies to a video recorder, the print data supply device 0103 applies to an image distribution server, and the print instruction device 0101 applies to a device which command-controls the video recorder.

In addition, hereafter referring to the communication path A as IEEE1394, an example of which the print instruction device 0101 command-controls the print device 0102 by an IEEE1394 AV/C protocol is explained. However, this is also just an example so the present invention is not limited to the range of this example. The communication path A can be the Internet (Ethernet (R), 802.11b, etc.) and the print device 0102 can be controlled by a Universal Plug and Play (UPnP) protocol. Note that, the IEEE1394 AV/C protocol is a protocol standardized by an IEEE1394 Trade Association (TA: http://www.1394ta.org). It relates to a connection of the AV devices and provides a framework in which each manufacturer can individually enhance a performance of a device by defining the least necessary command (AV/C command) as a standard protocol, while maintains compatibility among manufacturers. In particular, there is an AV/C Printer Subunit which determines the AV/C command relating to a print device (the detail is given in "1999038 AV/C Printer Subunit Specification 1.0" which is available at http://www.1394ta.org).

Similarly, referring to the communication path B as the Internet, for example, it is explained as that it performs a command control and a data transfer using a TCP/IP such as Hyper Text Transfer Protocol (HTTP) or a protocol on the UDP. This is also an example so that this invention is not limited to this example. Here, the HTTP is a protocol used for controlling a transfer of web page data written mainly in a Hyper Text Markup Language (HTML) format; used for transferring data other than the web page data; and used widely as a data transfer protocol on the Internet.

Furthermore, in this embodiment, for ease of explanation, the communication path A and the communication path B are described as different communication paths. However, the communication path A and the communication path B may be a same type of communication paths. For example, it may be a configuration in which both of the communication paths A and B are the Internet and the print instruction device 0101, the print device 0102, the print data supply device 0103 are connected commonly to the Internet (or Ethernet (R)). Similarly, any two of the print instruction device 0101, the print device 0102 and the print data supply device 0103 can be the same device. For example, the print instruction device 0101 and the print data supply device 0103 can be the same device.

A characteristic of the present invention is that the print instruction device 0101 issues a print command with the authentication information for accessing print data when it instructs the print device 0102 to print the print data in the print data supply device 0103 and that the print device 0102 securely receives the print data from the print data supply device 0103 using the authentication information.

Figure 1:
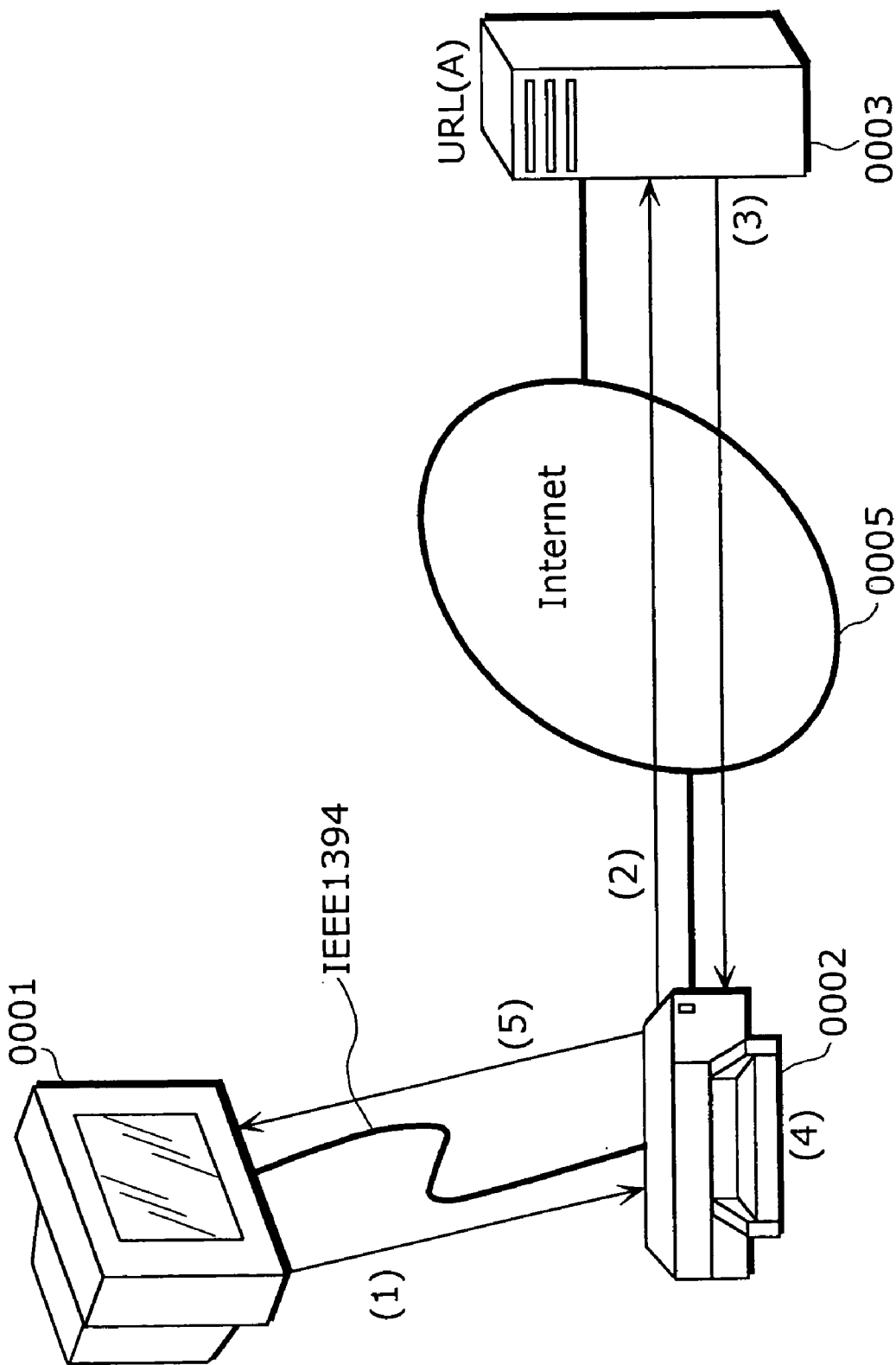
FIG. 1 is a diagram showing an existing print sequence in the case where printing of print data in a device different from a control device and a print device is instructed.

The print instruction device 0101 in the present invention only transmits authentication data (authentication information) together with an issue of the print command. Also, the print device 0102 mainly receives the print data from the print data supply device 0103. Accordingly, similar to the conventional example (the print system shown in FIG. 1), the print system according to the present invention has the benefit that processing of loads on the print instruction device 0101 can be reduced as well as the network loads.

In addition to the above mentioned advantages, the print instruction apparatus 0101 of the present invention can protect print data in the communication path B when printing data in the print data supply device 0103.

<Basic Sequence>

A basic sequence of the present invention is explained with reference to FIG. 3.

Figure 3:
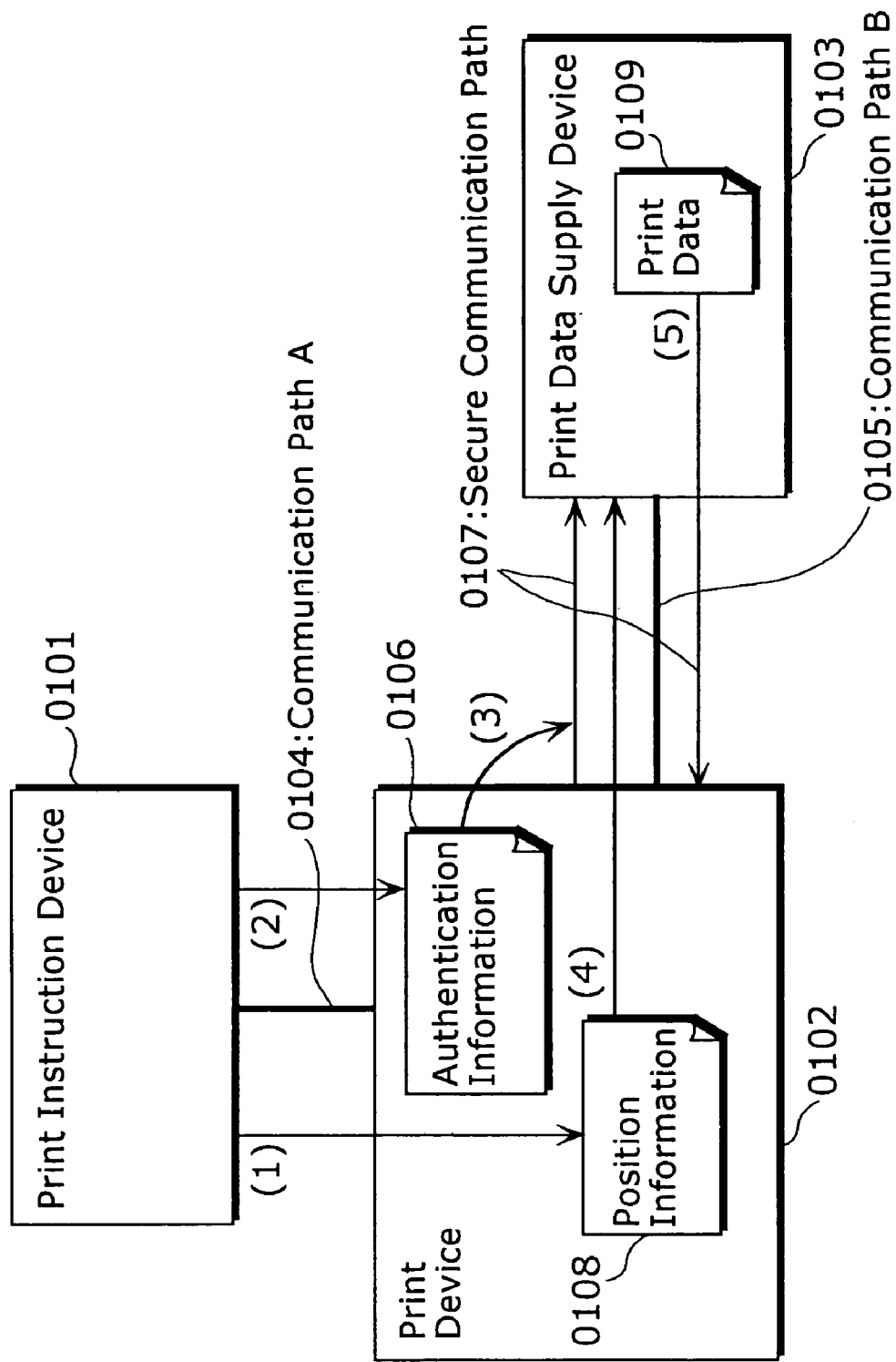
FIG. 3 is a diagram showing a basic sequence of the print system according to the present invention.

FIG. 3 indicates diagrammatically a print instruction sequence of the present invention based on FIG. 2. Similar to the configuration shown in FIG. 2, the configuration is a print system which is made up with three devices including the print instruction device 0101, the print device 0102 and the print data supply device 0103. The print instruction device 0101 and the print device 0102 are connected by the communication path A: 0104, and the print device 0102 and the print data supply device 0103 are connected by the communication path B: 0105. An arrow "→" in the diagram indicates a flow of a control command or data from a device at an initial point to a device at an end point, which flows through a communication path by which each device is connected to each other. In addition, a number in parentheses in the diagram indicates an order of the operation. Note that, the order of the operation in the diagram is just an example. Therefore, similar effects can be obtained even in the case where each operation is performed at the same time or where the order is switched.

The sequence starts its operation when specific conditions such as a print instruction from a user to the print instruction device 0101 and a reception of the broadcasting wave and a timer start at the print instruction device 0101 are fulfilled. As an initial state, data to be printed (print data 0109) are stored in the print data supply device 0103, and the print instruction device 0101 previously holds, by information input and the like from outside through a broadcasting wave or an input instruction of a user and the like, position information 0108 of print data to be printed by the print device 0102, and authentication information 0106 necessary for accessing the print data (e.g. a user ID, a device ID, a password and a newest of a public key of the certificate authority which issues a public key certificate of the print data supply device 0103, and the like).

The print instruction device 0101 firstly instructs the print device 0102 to print print data in the print data supply device 0103 (FIG. 3 (1)). Herein, the print data is held by the print data supply device 0103 so that position information 0108 of data to be printed is notified by a print instruction to the print device 0102. Also, at this time, information relating to data to be printed such as format and setting parameters (print parameters) necessary for printing, such as number of copies, quality and paper size may be notified to a print device.

Next, the print instruction device 0101 transfers to the print device 0102 the authentication information 0106 necessary for accessing the print data (FIG. 3 (2)). Here, when the authentication information 0106 needs to be protected, the print instruction device 0101 or the print device 0102 establishes in advance a secure communication path in the communication path A so that the transfer of the authentication information 0106 is performed through the secure communication path. Thus, the leakage of the authentication information 0106 (to the third party including a user) is prevented.

While it is explained later, if the print instruction at the procedure (1) and the authentication information 0106 at the procedure (2) correspond to each other, the order of procedures (1) and (2) may be at the same time or the order of the procedures (1) and (2) may be reversed.

Next, using the authentication information 0106 received at the procedure (2) (including a public key of the certificate authority which issues a public key certificate of the print data supply device 0103), a secure communication path 0107 is established on the communication path B which connects the print device 0102 to the print data supply device 0103 (FIG. 3 (3)). In the case where the authentication information 0106 is improper, where the print data supply device 0103 cannot be found, or where the establishment of the secure communication path 0107 has failed, the print device 0102 notifies the print instruction device 0101 that the printing cannot be continued and terminates the process. The print instruction device 0101 notifies, as necessary, a user that the printing could not be executed as required.

The print device 0102 then requests the print data supply device 0103 to transmit print data 0109 which can be specified by the position information 0108 received at the procedure (1) using the secure communication path 0107 established at the procedure (3) (FIG. 3 (4)).

The print data supply device 0103 which received the request transmits, when the print data 0109 which can be specified by the position information 0108 exists, the print data 0109 to the print device 0102 through the secure communication path 0107 which is established at the procedure (3) (FIG. 3 (5)). When the print data 0109 does not exist, the print data supply device 0103 notifies about that to the print device 0102. The print device 0102 which received the notice that the print data 0109 does not exist notifies the print instruction device 0101 that the process cannot be further executed and terminates the process. The print instruction device 0101 notifies, as necessary, a user that the printing could not be executed.

Through the above mentioned processes, the print device 0102 which is instructed printing receives the print data 0109 and can start printing. Note that, when it has received a printing parameter at the procedure (1), the print device 0102 performs printing based on the parameter. Accordingly, various printings based on the printing parameter can be realized by the print device 0102. Also, the print device 0102 may discard the received authentication information 0106 when the printing is completed at the procedure (2). Thus, the print device 0102 discards the authentication information 0106 every time when printing is completed. Therefore, a holding time of the authentication information 0106 by the print device 0102 can be minimized and the security of the authentication information 0106 which requires secrecy can be further strengthened.

In the above, the basic sequence of the present invention is explained with reference to FIG. 3. The authentication information 0106 can be an identification ID of the print instruction device 0101, a pair of an ID and a password for identifying a user and a print instruction device 0101, an encryption key for decrypting the encrypted print data 0109, a public key certificate of the user or the print instruction device 0101 used for establishing SSL, and the public key certificate of the certificate authority. Also, the position information 0108 of the print data 0109 relies on the communication path B which connects the print device 0102 to the print data supply device 0103 so that it is not particularly specified. For example, in the case where the communication path B is the Internet as in the present embodiment, a Uniform Resource Identifier (URI) is appropriate. In particular when the print data is transferred using a HTTP, a URL is appropriate. Herein, in the case where the authentication information is specifically an ID or a pair of the ID and a password, the authentication information 0106 may be embedded into the position information 0108 of the print data 0109. Specifically, the ID or the pair of the ID and the password may be embedded into the URI in a format of "ID(:password)@position information of print data". For example, as "position information of print data?ID=ID (&PASSWORD=PASSWORD)" shows, the position information 0108 of the print data 0109 and the ID or the pair of the ID and the password may be shown using the URL format. Thus, by embedding the authentication information 0106 into the position information 0108 of the print data 0109, a print instruction which accompanies the authentication information 0106 shown in the present embodiment can be realized without performing an extension for transmitting the authentication information in the pre-existing print instruction method. While it is explained later in detail, it can solve a problem that it is difficult to associate the position information 0108 of the print data with authentication information 0106 in the basic sequence. Also, it is possible that the print device 0102, without sensing an existence of the authentication information 0106, transmits the position information 0108 of the print data in which the authentication information 0106 is embedded in the print data supply device 0103 and requests the print data 0109.

Also, the position information 0108 of the print data is not limited to one piece of information such as a URL. For example, it can be a combination of two pieces of information of identification information of the print data supply device 0103 in the communication path and the position information 0108 of the print data in the print data supply device 0103. For example, referring to a one-way communication path B as the Internet and the print data transfer protocol as a File Transfer Protocol (FTP), a combination of a position IP address on the network of the print data supply device 0103 and a file path in the print data supply device 0103 is appropriate.

Furthermore, in this example, the authentication information 0106 necessary for an access is different for each print data 0109 and the transfer of the authentication information 0106 at the procedure (2) is performed for each print instruction at the procedure (1). However, the same authentication information 0106 can be used by a plurality of print instructions in the following print systems and the like: a print system in which the same authentication information 0106 may be used unless the authentication information 0106 is different for each print data supply device 0103 and is the print data 0109 on the same print data supply device 0103; and a print system in which same authentication information 0106 may be used for any print data 0109 on any print data supply device 0103 unless the authentication information 0106 is set for each user and a print instruction is from the same user. In such case, it is possible to omit the procedure (2) which transfers the authentication information for each print instruction by allowing the print device 0102 to have a function of memorizing the authentication information 0106 received in the past.

Specifically, the print instruction device 0101 transfers the authentication information 0106 to the print device 0102 before instructing printing at the procedure (1) and the print device 0102 stores the received authentication information 0106.

When the print instruction device 0101 instructs the print device 0102 to perform printing, the print device 0102 obtains the authentication information 0106 which has been stored previously and transfers to the procedure (3). When there is no authentication information 0106, the print device 0102 notifies the print instruction device 0101 that appropriate authentication information 0106 has not been sent.

In the case where the plurality of pieces of authentication information 0106 can be stored in the print device 0102, the print instruction device 0101 transfers identification information for identifying the authentication information 0106 when transferring the authentication information 0106. Note that, it can be a method of transmitting the identification information 0106 as one of the components of the authentication information 0106. The print device 0102 keeps storing the identification information and the authentication information even after the completion of printing. When the print instruction device 0101 instructs the print device 0102 to perform printing using the authentication information which is the same as the authentication information transmitted at the last print instruction, it instructs printing by adding the identification information for identifying the authentication information 0106 which is necessary for accessing the print data 0109, obtains the authentication information 0106 which is identifiable from the identification information in the print device 0102, and transfers to the process (3). When the print device 0102 does not store the authentication information 0106 which is identifiable from the identification information, it notifies about that to the print instruction device 0101.

In the basic sequence based on FIG. 3, as a framework of protecting the print data 0109, an example of establishing a secure communication path 0107 for accessing the print data 0109 is explained. In electronic commerce, a method of combining an authentication such as a password into the SSL is widely used. The method has a mechanism in which data leakage is prevented by encrypting a communication path using the SSL, a data receiver is specified by transmitting the authentication information such as a pair of the ID and the password via the SSL, and access is controlled. Therefore, this method is used in the secure communication path explained later in the present embodiment.

However, this invention is not restricted to this method, so that other methods can be applied if the print data is protected based on the authentication information.

For example, it can be a method of not transmitting the authentication information which requires secrecy such as a pair of an ID and a password via the SSL which is a secure communication path, but transmitting the SSL public key certificate of the user and the print instruction device or a public key certificate of the certificate authority as authentication information, and establishing a SSL between the print device and the print data supply device using the authentication information. Herein, the public key certificate of the certificate authority can be obtained by an indefinite number of users so that it cannot be used for charging the user. However, the print data can be transmitted via the established SSL so that the print data can be protected.

Also, it can be a method of not establishing the secure communication path 0107, but notifying the print data supply device 0103 and getting access permission, and receiving the data via a conventional communication path when the print device 0102 requests the print data supply device 0103 to transmit the print data. The authentication information in this method is, for example, a combination of an ID for identifying the print instruction device 0101 or the user and a password identical to the ID. In this method, charging the print data receiver can be performed; an unauthorized access to the print data held by the print data supply device 0103 can be prevented; and the print data is not encrypted. While there is a benefit of reducing the processing loads on the print device 0102 and the print data supply device 0103, there is a disadvantage that the leakage of the print content by tapping through the communication path cannot be prevented.

Furthermore, it can be a method for the print data supply device 0103 to transmit, in response to a request of the print data from the print device 0102, the encrypted print data via the conventional communication path. In this case, the authentication information becomes a decryption key and the print device 0102 decrypts and prints the received data using the authentication information. In this method, while there is a benefit of preventing the leakage of the print content by tapping through the communication path, there is no mechanism for specifying a print data receiver. Therefore, it is necessary to propose another method for charging the print data receiver.

Further, it can be a method that, referring to session information of a secure communication path previously established between the print instruction device 0101 and the print data supply device 0103 as the authentication information, the print device 0102 receives the authentication information from the print instruction device 0101 and notifies the authentication information to the print data supply device 0103. In this case, the authentication information is a pair of session information pieces such as a Cookie and the public key (or public key certificate) of a certificate authority of the print data supply device 0103. The contents of the Cookie are, for example, information for identifying the print data supply device 0103 (e.g. a URL of the print data supply device 0103), information indicating that the print instruction device 0101 is admitted as an authorized user by the authentication by the print data supply device 0103. The print data supply device 0103 receives the session information from the print device 0102, verifies that the received session information is issued by itself, and then identifies the print device 0102 from the information indicating that it is verified as an authorized user as the print instruction device 0101 which has been verified as an authorized user. Therefore, it is not necessary to perform another authorization on the print device 0102. For example, before ordering printing from the print data supply device 0103 to the print instruction device 0101, a secure communication path is established by an authentication and the like between the print instruction device 0101 and the print data supply device 0103 and the Cookie as the session information is set from the print data supply device 0103 to the print instruction device 0101. The print instruction device 0101 transmits the Cookie in an order of (2) in FIG. 3 as the authentication information 0106 to the print device 0102. The print device 0102 requests the print data supply device 0103 of the print data 0109 together with the Cookie at the procedures (3) and (4) in FIG. 3. Consequently, the secure communication path between the print instruction device 0101 and the print data supply device 0103 are taken over to the communication path B: 0105 between the print device 0102 and the print data supply device 0103 (that is, the print device 0102 pretend the print instruction device 0101 and can establish a secure communication path B: 0105 for receiving print data safely between the print device 0102 and the print data supply device 0103), and the print device 0102 can receive the print data via the secure communication path B: 0105.

Note that, in FIG. 3 (2), the authentication information 0106 which is passed from the print instruction device 0101 to the print device 0102 can be, for example, a pair of an ID and a one-time password which can be used only once. Also it can be a method of, when the authentication information 0106 is the one which can be used once, maintaining a secure communication path 0107 continuously by reissuing the authentication information 0106 which can be used continuously when establishing a secure communication path 0107 using the authentication information 0106 at the (3) in FIG. 3, and by which the print data supply device 0103 sets the session information such as a Cookie to the print device 0102 when establishing the secure communication path 0107 using the authentication information 0106 at the procedure (3) in FIG. 3. Here, it is explained about a specific procedure for a method of establishing a secure communication path using the SSL and the authentication with reference to FIG. 4.

Figure 4:
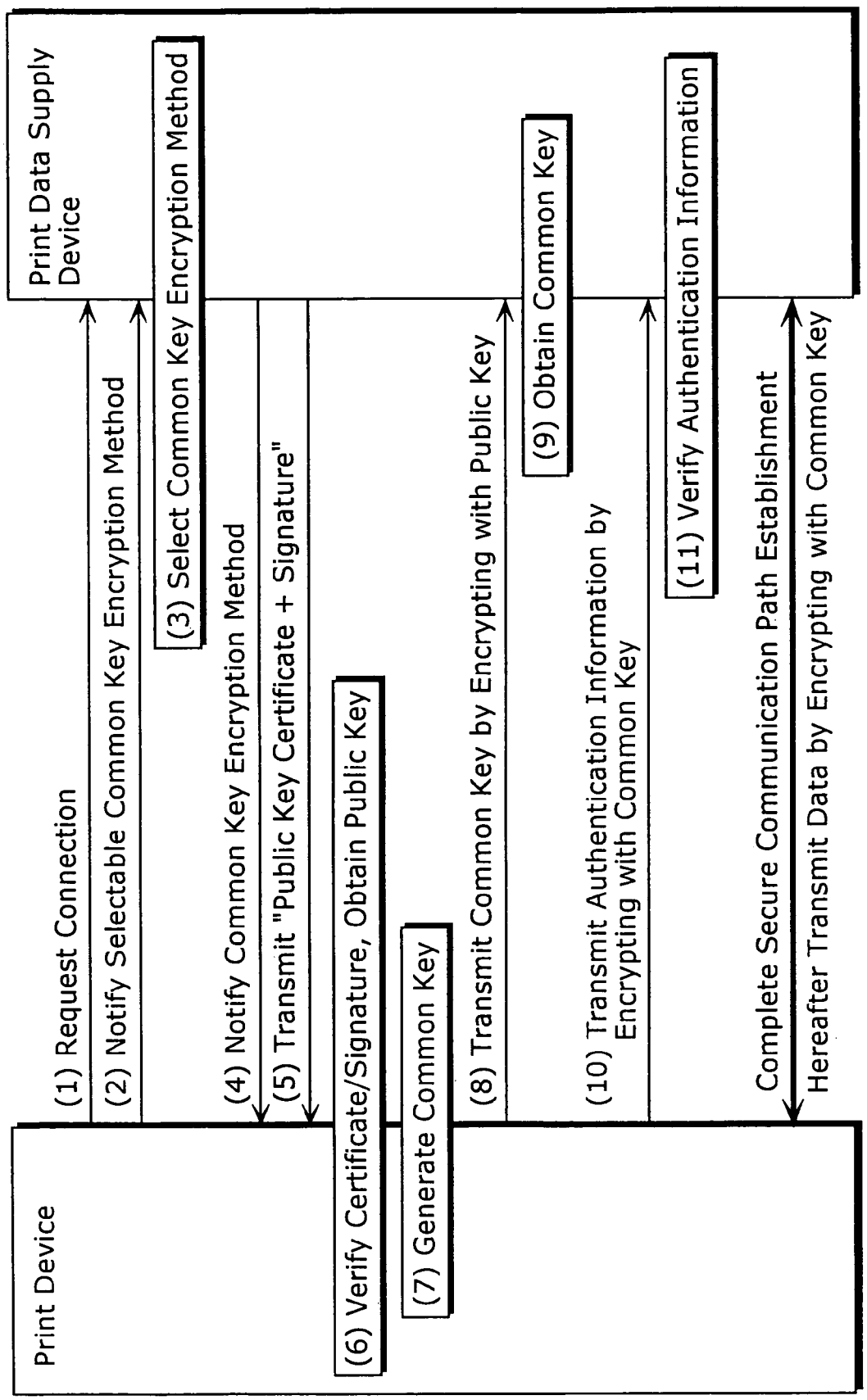
FIG. 4 is a diagram showing a sequence in the case where a secure communication path is established using a SSL.

First, the print device 0102 transmits a request for connection to the print data supply device 0103 (FIG. 4 (1)). The print device 0102 then notifies the print data supply device 0103 of a common key encryption method which is supported by the print device 0102 (FIG. 4 (2)). The print data supply device 0103 selects the best common key encryption method among those notified at the procedure (2) (FIG. 4 (3)) and notifies the best common key encryption method to the print device 0102 (FIG. 4 (4)). The print data supply device 0103 then notifies the print device 0102 of a public key certificate and a signature signed by own secret key (FIG. 4 (5)). The print device 0102 verifies a validity of the public key certificate received at the procedure (5) using the public key of the certificate authority, rakes out the public key from the public key certificate and verifies the validity of a signature using the public key (FIG. 4 (6)). Next, the print device 0102 generates a common key (FIG. 4 (7)) for a common key encryption method notified at the procedure (4) using a random number, encrypts the common key generated at the procedure (7) with a public key of the print data supply device 0103 taken out at the procedure (6), and transmits to the print data supply device 0103 (FIG. 4 (8)). The print data supply device 0103 takes out the common key by decrypting data received at the procedure (8) with own secret key (FIG. 4 (9)). Note that, in a strict sense, it is said that a secure communication path is established at this point where both the print device 0102 and the print data supply device 0103 have a common key. However, following that, the authentication information for receiving an authentication of a server is often transmitted and received through a secure communication path. Therefore, in a broad sense, as shown in FIG. 4, it is considered that a secure communication path is established at the point where the transmission of the authentication information from the print device 0102 to the print data supply device 0103 is completed. The print device 0102 then encrypts the authentication information 0106 received from the print instruction device 0101 with the common key generated at the procedure (7), and transmits the encrypted information to the print data supply device 0103 (FIG. 4 (10)). Lastly, the print data supply device 0103 decrypts the data received at the procedure (10) with the common key taken out at the procedure (9), takes out the authentication information, and verifies that the print device 0102 can access own (print data supply device 0103) print data by checking the content of the authentication information (FIG. 4 (11)). Following the above procedures, access from a device without having the authentication information 0106 is prohibited. Also, the print data to be transmitted from the print data supply device 0103 is encrypted with the common key shared at the procedures (7) and (9). Accordingly, the print data on the communication path can be prevented from being tapped and printed by a third party on the Internet.

Here, in the basic sequence, the position information 0108 and the authentication information 0106 of the print data 0109 are transmitted from the print instruction device 0101 to the print device 0102 when the printing is instructed. However, in order to correctly access the print data 0109, it is necessary to have a mechanism of associating the position information 0108 with the authentication information 0106 of the print data.

For example, there are the following mechanisms: (a) a mechanism of transmitting the authentication information and the print instruction at the same time by including the authentication information when the command of the print instruction in "FIG. 3 (1)" is transmitted; (b) a mechanism of not instructing another printing until the authentication information in "FIG. 3 (2)" which corresponds to the print instruction in "FIG. 3 (1)" is transmitted; (c) a mechanism of setting an identification number for identifying one among a plurality of printing jobs such as Job_ID when the printing is instructed in "FIG. 3 (1)", and transmitting the authentication information in "FIG. 3 (2)" together with the identification number; and (d) a mechanism of embedding, as described above, the authentication information 0106 into the position information 0108 of the print data 0109.

Here, as a method of instructing printing from the print instruction device 0101 to the print device 0102, there is a method of instructing printing by transmitting print instruction information (job ticket) which collects information relating to the print instruction as one piece of information. An example of the print instruction information is shown in FIGS. 5A and 5B. In the example shown in FIG. 5A, one piece of information is composed of information relating to data to be printed such as the position information 0108 of the print data 0109 and a format, and a setting parameter (printing parameter) necessary for the printing such as number of copies, quality and paper size.

By applying the print instruction method using this print instruction information to the present invention and including the position information 0108 of the print data 0109 and the corresponding authentication information 0106 into the print instruction information, the position information 0108 of the print data 0109 can be easily associated with the authentication information 0106, and the data transmission from the print instruction device 0101 to the print device 0102 only needs the print instruction information. Thus, there is a benefit of reducing the communication traffic.

Two embodiments in which a print instruction method using print instruction information is applied to the basic sequence of the present invention will now be explained.

Figure 6:
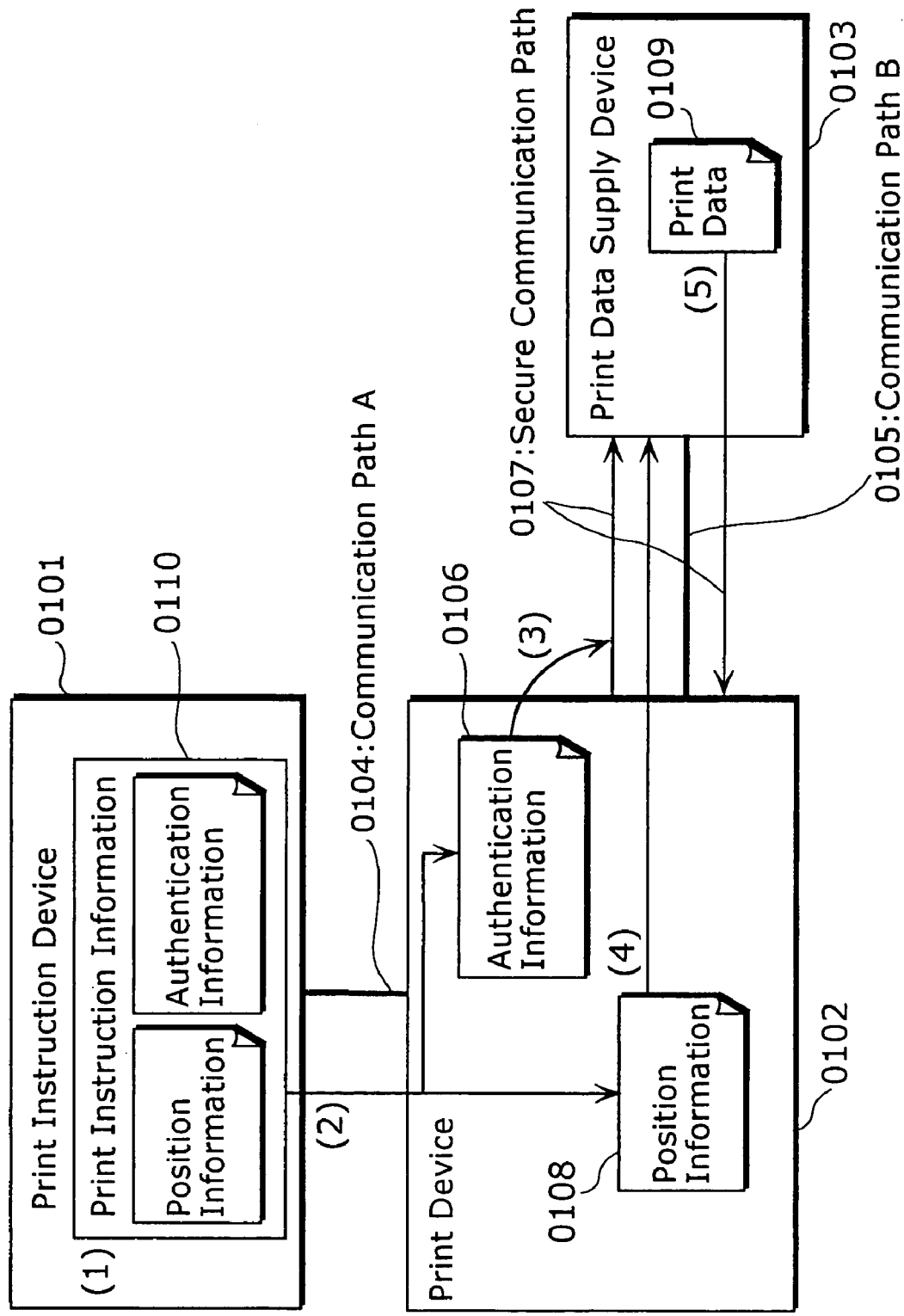
FIG. 6 is a diagram showing a print instruction information push sequence of the print system by the present invention.

First, with reference to FIG. 6, an embodiment is explained in which the print instruction is performed by the print instruction device to push transfer the print instruction information including the position information and authentication information of print data to the print device.

<Print instruction Information Push Sequence>

The print instruction information push sequence differs from the basic sequence of the present invention explained with reference to FIG. 3 in that the position information of the print data and the authentication information to the print device are transmitted at the same time by collecting the position information of the print data and the authentication information for accessing to the print data as one piece of print instruction information. As described above, this can easily associate the position information of the print data with the authentication information, which has been a concern in the basic sequence. In addition, it also leads to a reduction in the amount of communication traffic since the data transmission from the print instruction device to the print device only requires transmitting the print instruction information.

A system configuration in FIG. 6 is same as that in FIG. 2 and FIG. 3. Also, arrows → and numbers in parentheses in FIG. 6 are used the same as in FIG. 3. Further, the order of the operations in the diagram is just an example. Therefore, similar effects can be obtained even if each operation is performed at the same time or the order of the operations is switched.

The present sequence starts operations when a print instruction to the print instruction device 0101 by a user and specific conditions such as timer in the print instruction device 0101 are fulfilled. At an initial state, data to be printed (print data 0109) has been stored in the print data supply device 0103. The print instruction device 0101 has held the position information 0108 of print data to be printed by the print device 0102 and the authentication information 0106 necessary for accessing to the print data, by the input of information from outside through an input instruction from a user or through a broadcasting wave and the like.

First, the print instruction device 0101 generates print instruction information 0110 including the position information 0108 of the print data 0109 and the authentication information 0106 (FIG. 6 (1)). Except that it needs to include the position information 0108 of the print data 0109 and the authentication information 0106, a style of the print instruction information 0110 and other information included inside are arbitrary and it is the same in a sequence explained later. An example of the print instruction information 0110 including the position information 0108 of the print data 0109 and the authentication information 0106 in FIG. 5B is shown. In this example, "http://www.pana.com/document.html" is included as the position information 0108 of the print data 0109, "ID: Matsushita Taro Pass: password" are included as the authentication information 0106, and a parameter (print parameter) for printing such as number of copies and quality are included.

Next, the print instruction device 0101, to the print device 0102, transmits the print instruction 0110 generated at the procedure (1) and instructs to print the print data 0109 on the print data supply device 0103 (FIG. 6 (2)).

Herein, instead of including information relating to data to be printed such as the format and the setting parameters (print parameters) necessary for the printing such as number of copies, quality and paper size, they may be notified separately to the print device 0102. When the print parameter is also included in the print instruction information 0110, it is more effective to specify and separately notify the print parameter which cannot be specified in the print instruction information 0110.

Also, in this embodiment, it is explained about an example of instructing printing by transmitting the print instruction information 0110 directly to the print device 0102. However, in notifying the print device 0102 of transmitting the print instruction information 0110, the print instruction information 0110 may be transmitted after receiving a response from the print device 0102. This is because, when a communication path A connecting the print instruction device 0101 to the print device 0102 is IEEE 1394 and the like and a communication protocol differs between a control system and a data transmission system, it is preferable to notify the print device 0102 of transmitting a job ticket once and wait to receive data (job ticket). Furthermore, when it is necessary to protect data in the print instruction information 0110 such as authentication information 0106, the print instruction device 0101 establishes in advance a secure communication path in the communication path A and transmits the print instruction information in the procedure (2) via the secure communication path. Consequently, leakage (to a third party including a user) of the position information 0108 of the print data and the authentication information 0106 can be prevented.

The position information 0108 of the print data and the authentication information 0106 for accessing the print data are included in the print instruction information 0110 that the print device 0102 received. After this process, processes until the print device 0102 receives the print data 0109 from the print data supply device 0103 are totally the same as the processes in the basic sequence of the present invention explained with reference to FIG. 3.

That is, the print device 0102 establishes a secure communication path 0107 (FIG. 6 (3)) between the print device 0102 and the print data supply device 0103 using the authentication information 0106, and then requests the print data supply device 0103 (FIG. 6 (4)) to transmit the print data 0109 that can be specified by the position information 0108 of the print data through the secure communication path 0107. The print data supply device 0103 which received the request transmits the print data 0109 to the print device 0102 via the secure communication path 0107 (FIG. 6 (5)).

Throughout the processes explained above, the print device 0102 receives the print data 0109 instructed for printing and can start the printing. Note that, when the print parameter is included in the print instruction information 0110 or when the print parameter is received in the procedure (2), the print device 0102 performs printing based on the parameter. Consequently, various printing processes based on the parameter can be realized in the print device 0102.

In the above, the embodiment is explained in the case where the print instruction information 0110 is push-transferred from the print instruction device 0101 to the print device 0102. Next, with reference to FIG. 7, an embodiment is explained in the case where the print instruction device 0101 notifies the print device 0102 of the position information of the print instruction information 0110 and instructs printing, and where the print device 0102 pull-receives the print instruction information 0110 from the print instruction device 0101 based on the position information of the print instruction information 0110.

<Print instruction Information Pull Sequence>

The print instruction information pull sequence differs from the "print instruction information push sequence" explained with reference to FIG. 6 and is a method of instructing the print device 0102 of printing and a method of receiving the print instruction information 0110 in the print device 0102. That is, the print instruction device 0101 instructs the print device 0102 to print by notifying the print device of the position information of the print instruction information 0110, and the print device directly requests and receives the print instruction information 0110 based on the position information of the notified print instruction information 0110.

In the present sequence, the print instruction information 0110 (FIG. 5B) including the position information 0108 of the print data 0109 and the authentication information 0106 is used so that, similar to the "print instruction information push sequence", the position information 0108 of the print data 0109 and the authentication information 0106 can be easily associated with each other.

Also, in the "print instruction information push sequence", in the case of receiving the print instruction, it is necessary to ensure a memory resource sufficient to store the print instruction information 0110. However, in the present sequence, in the case of receiving the print instruction, it is necessary to have a memory resource sufficient only for storing the position information of the print instruction information 0110. If the data in the print instruction information 0110 is needed, it is possible to request and receive the data as much as it is necessary based on the position information of the print instruction information 0110 so that the memory resource of the print device can be used effectively.

Further, in the case where the print instruction information 0110 has existed in another device separately from the print instruction device 0101, the print instruction device 0101 can instruct the print device 0102 based on the position information of the print instruction information 0110 on another device.

A system configuration in the present sequence is same as that in FIG. 6. In addition, arrows → and numbers in parentheses are used the same as in FIG. 6.

In the sequence of the present embodiment, operations are started when print instructions from a user and the like to the print instruction device 0101 and specific conditions such as timer in the print instruction device 0101 are fulfilled. As an initial state, data to be printed (print data 0109) is stored in the print data supply device 0103, and the print instruction device 0101 holds the authentication information necessary for accessing the position information 0108 of the print data and the print data to be printed by the print device 0102 by the inputs of information from outside through the input instruction from the user, the broadcasting wave, or the like.

First, the print instruction device 0101, similar to the embodiment explained with reference to FIG. 6, generates the print instruction information 0110 including the position information 0108 of the print data and the authentication information 0106 and stores it in itself (FIG. 7 (1)). Note that, the print instruction information 0110 may include information relating to data to be printed such as format and a setting parameter (print parameter) necessary for printing such as number of copies, quality, and a paper size.

Figure 7:
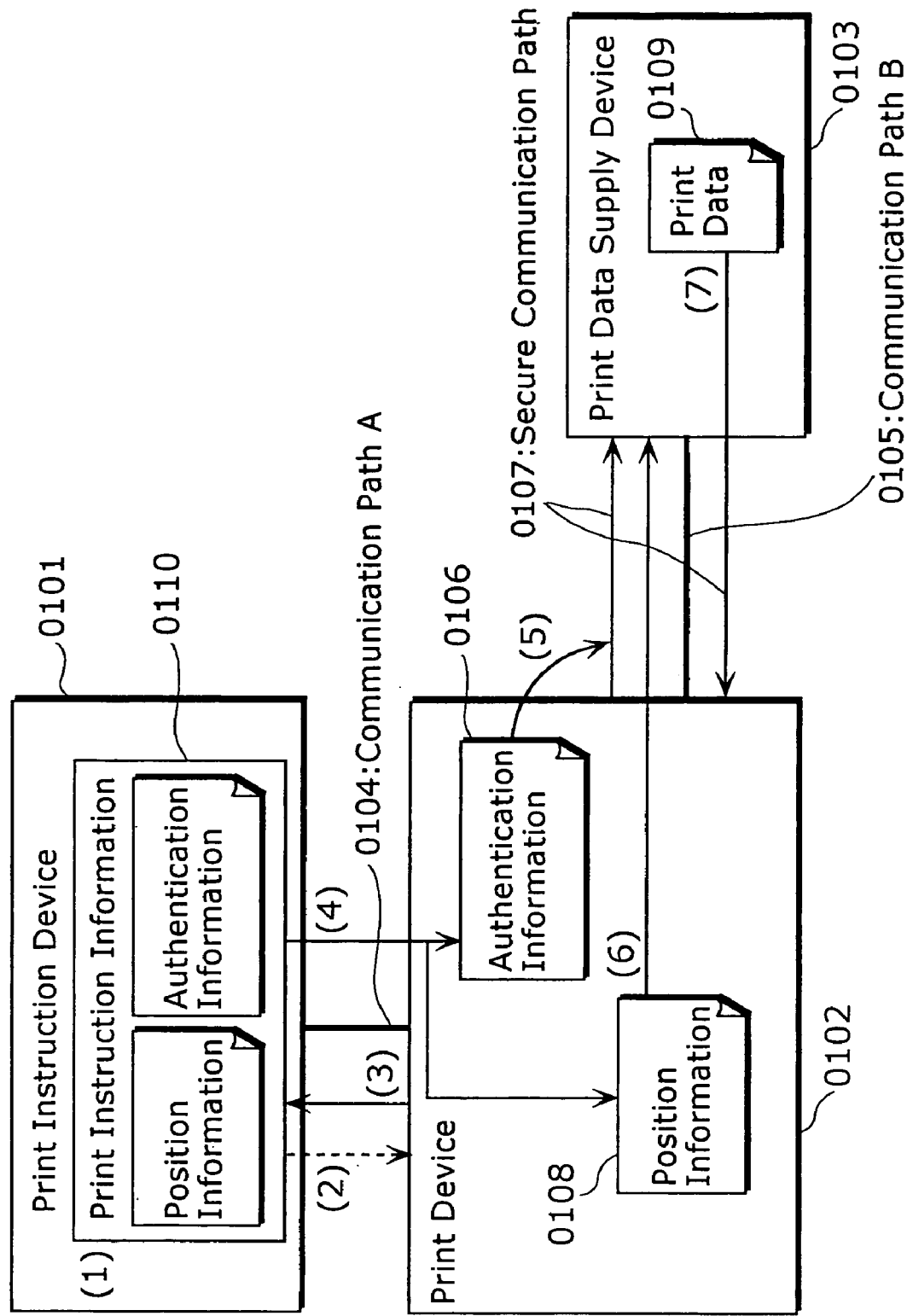
FIG. 7 is a diagram showing a print instruction information pull sequence of the print system by the present invention.

The print instruction device 0101 then notifies the print device 0102 of the position information of the print instruction information 0110 generated at the procedure (1) and instructs printing of the print data 0109 (FIG. 7 (2)). Herein, the print parameter may be notified to the print device 0102. When the print parameter is included also in the print instruction information 0110, it is more effective to select a print parameter which cannot be specified by the print instruction information 0110.

Then, the print device 0102, to the print instruction device 0101, requests the print instruction information 0110 which can be specified by the position information received at the procedure (2) (FIG. 7 (3)).

The print instruction device 0101 which received the request transmits the print instruction information 0110 to the print device 0102 (FIG. 7(4)). Note that when it is necessary to protect data such as the authentication information 0106 in the print instruction information 0110, the print instruction device 0101 or the print device 0102 establishes in advance a secure communication path in the communication path A, and the data of the print instruction information 0110 is received via the secure communication path. Consequently, the leakage (to the third party including a user) of the position information 0108 of the print data 0109, the authentication information 0106 and the like can be prevented.

Through the above processes, the print device 0102 receives the print instruction information 0110. However, the processes after the above processes are same as the processes after the process at the procedure (3) in FIG. 6. The explanation of the later processes is therefore omitted.

As mentioned above, concerning the method of instructing printing in the present invention, the "basic sequence" of the present invention and the two sequences including "print instruction information push sequence" and "print instruction information pull sequence" applying to the print instruction method using the print instruction information 0110 are explained.

Whereas an example of which three sequences receive one piece of print data 0109 is explained, the plurality of print data 0109 can be received. In this case, the plurality of position information of the plurality of print data is written in the position information 0108 of the print data 0109. The procedures (4) to (5) in FIG. 3 and FIG. 6 and the procedures (6) to (7) in FIG. 7 are repeatedly performed, and the print device 0102 receives the plurality of print data 0109 through the secure communication path 0107.

Also, a link to other data is further set from the print data 0109. When the linked data is needed for which the print device 0102 performs printing, similarly the procedures (4) to (5) in FIG. 3 and FIG. 6 and the procedures (6) to (7) in FIG. 7 are performed. The print device 0102 then receives data linked from the print data 0109 through the secure communication path.

Furthermore, an example in which the print instruction device 0101 and the print device 0102 are connected to each other by the communication path A: 0104 similarly in three sequences is explained. However, it can be an embodiment in which the print instruction device 0101 and the print device 0102 are not connected to each other by the communication path and data is transmitted and received through a memory card medium such as an SD card or a compact flash (R). Herein, the print instruction device 0101 stores the position information 0108 of the print data 0109 and the authentication information 0106 or the print instruction information 0110 into the memory card medium. The user inserts the stored information into the print device 0102; the print device 0102 recognizes that the printing is instructed by the print instruction device 0101; and the printing is instructed. A behavior after receiving the position information 0108 of the print data 0109 and the authentication information 0106 or the print instruction information 0110 is similar to that in the previous embodiment, and the processes after the procedure (3) in FIG. 3 and FIG. 6 or the processes after the procedure (5) in FIG. 7 are performed.

Next, relating to the print device, its internal operation in the "basic sequence", "print instruction information push sequence", and "print instruction information pull sequence" of the present invention is explained. The duplicated part such as authentication information and a type of the secure communication path are the same as the content which has been explained, and thus, the explanation is omitted.

<Embodiment of Print Device in Basic Sequence>

A specific behavior of the print device in the basic sequence of the present invention is explained with reference to FIG. 8. The print device 0220 is a device which prints print data. For example, it applies to a print device such as an inkjet print device or a laser print device, a facsimile (FAX), or a Multi Function Peripheral (MFP). Note that as described above, these apply when the data to be used is print data. The present embodiment therefore is not limited to this example. When the data to be used is music data, a print device 0220 becomes a device which reproduces and records music data. When the data to be used is video data, it becomes a device which reproduces and records the video data.

The print device 0220 is connected, through the communication path, to a print instruction device 0210 which instructs the print device to print and to a print data supply device 0230 which transfers the print data according to a request of the print device. The print instruction device 0210 applies, for example, to a personal computer, a digital television, a cellular phone, a DVD recorder, a HDD recorder, an AV server, a remote controller and the like. Besides, any devices that can issue a command to other devices can be applied. The print data supply device 0230 applies, for example, to a server on the Internet, a PC, a digital still camera, an AV server, a DVD recorder, a HDD recorder and the like. In an example shown in FIG. 8, devices are connected respectively through different communication paths. However, it is just an example so that the communication paths can be the same type of communication path or different types of communication paths. Similarly, the print instruction device 0210 and the print data supply device 0230 can be the same device.

Further, the print device 0220 has, in its inside, a print instruction receiving unit 0221, a communication path establishing unit 0222, a print data requesting unit 0223, a print data receiving unit 0224, and a printing unit 0225.

The print instruction receiving unit 0221 has a function of receiving a print instruction from the print instruction device 0210. Further in the present embodiment, whereas the print instruction receiving unit 0221 has a function of storing information according to print instruction such as the print data position information 0201 and the authentication information 0202, it may include another unit (storage unit) which stores information according to another print instruction.

Whereas it is not shown in the diagram, the print instruction receiving unit 0221 may have a function of receiving a parameter (print parameter) relating to printing in the printing unit 0225 that is explained later when the print instruction receiving unit 0221 receives the print instruction.

Herein, it stores the received print parameter and passes the print parameter to the printing unit 0225 when it processes printing.

The communication path establishing unit 0222 has a function of establishing a secure communication path using the authentication information 0202 received and stored in the print instruction receiving unit 0221. Here, whereas it is not explained in the present embodiment, when the secure communication path is cut due to wire obstacles and the like, the communication path establishing unit 0222 may have a function of restoring the secure communication path according to need.

The print data requesting unit 0223 has a function of requesting the print data supply device 0230 to transmit the print data 0230 through the secure communication path established by the communication path establishing unit 0222 using the print data position information 0201 received and stored by the print instruction receiving unit 0221.

The print data receiving unit 0224 has a function of receiving the print data 0203 transmitted from the print data supply device 0230 through the secure communication path 0240. Also, in the present embodiment, the print data receiving unit 0224 has a function of storing the received print data 0203. However, it may set a unit (storage unit) which stores another print data 0203, or may set a function of storing the print data 0203 into the printing unit 0225 which is explained later.

The printing unit 0225 has a function of printing the print data 0203 received and stored by the print data receiving unit 0224. As described above, when the print instruction receiving unit 0221 also receives a print parameter, the printing is performed based on the print parameter received from the print instruction receiving unit 0221.

Hereafter, a flow of specific processes in the print device 0220 is explained.

Figure 8:
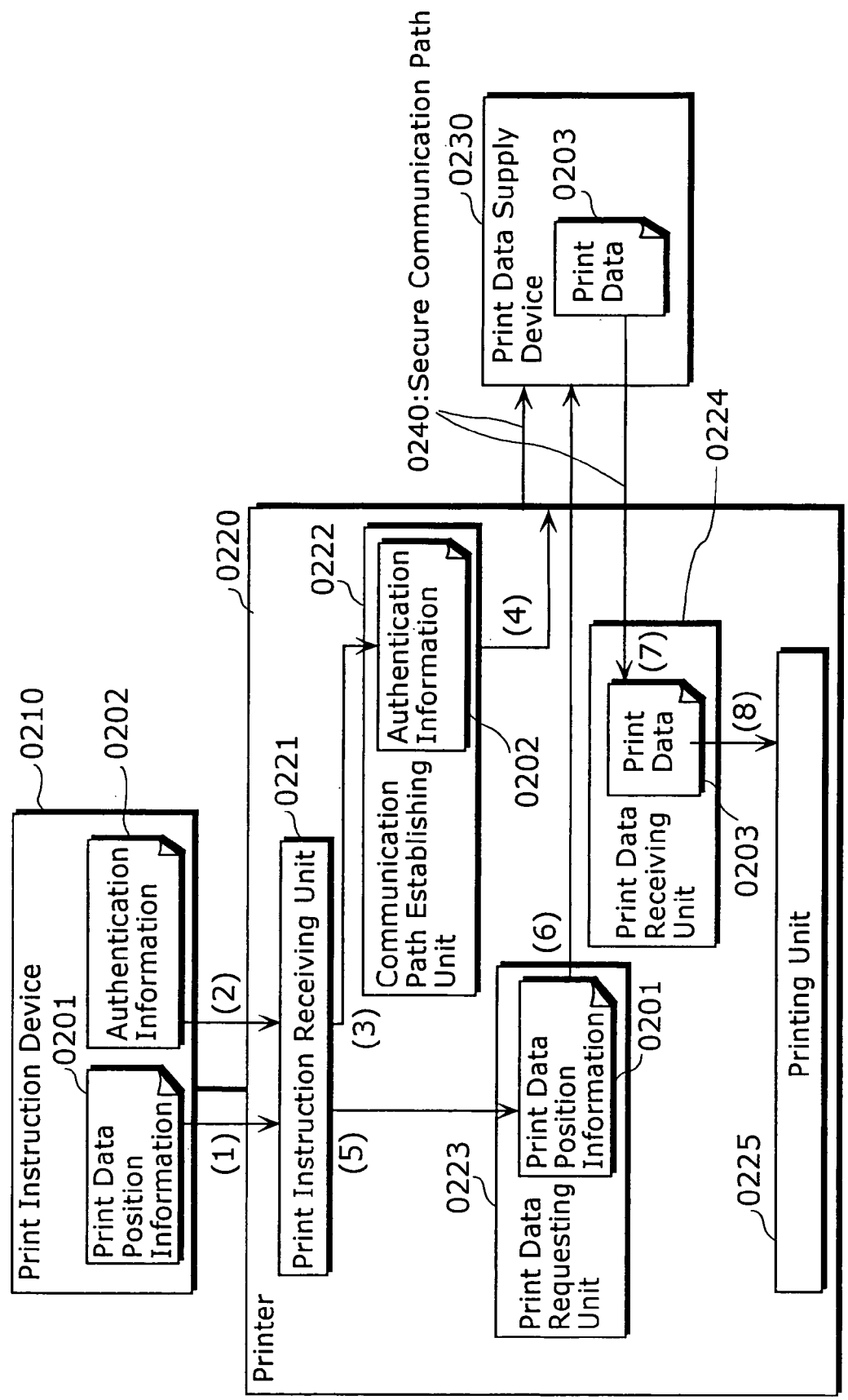
FIG. 8 is an internal sequence of a print device in the basic sequence shown in FIG. 3.

First, the print device 0220 accepts the print instruction by receiving the print data position information 0201 from the print instruction device 0210 at the print instruction receiving unit 0221 and starts the process (FIG. 8 (1)).

The print instruction receiving unit 0221 stores the received print data position information 0201.

Next, the print instruction receiving unit 0221 receives the authentication information 0202 for accessing the print data 0203 from the print instruction device 0210 (FIG. 8 (2)), and stores the received information by associating with the print data position information 0201 received at the procedure (1).

Note that, only if the print instruction (print data position information 0201) at the procedure (1) associates with the authentication information 0202 at the procedure (2), the order of procedures (1) and (2) can be performed at the same time or the order of procedures (1) and (2) can be reversed.

After finishing the processes up to the procedure (2), the print instruction receiving unit 0221 specifies a print data supply device 0230 which holds the print data 0203 from the print data position information 0201, notifies and requests the communication path establishing unit 0222 of the authentication information 0202 so that a secure communication path 240 is established between the specified print data supply device 0230 and the print device 0220 (FIG. 8 (3)).

The communication path establishing unit 0222 which received the request establishes the secure communication path 0240 between the print data supply device 0230 and the print device 0220 using the authentication information received at the procedure (3) (FIG. 8 (4)). Here, when the print data supply device 0230 cannot be found or the secure communication path cannot be established because of the incompatibility of the authentication information 0202 and the like, the following processes cannot be executed. The communication path establishing unit 0222 therefore requests the print instruction information receiving unit 0226 to notify the print instruction device 0210 that the following processes cannot be executed.

Next, the print instruction receiving unit 0221 notifies the print data requesting unit 0223 of the print data position information 0201 and requests to have the print data 0203 which can be specified from the print data position information 0201 (FIG. 8 (5)).

The print data requesting unit 0223 which received the request, using the print data position information 0201 received at the procedure (5), requests the print data supply device 0230 of transmitting the print data through the communication path 0240 established at the procedure (4) (FIG. 8 (6)).

After finishing the processes up to the procedure (6), the print data receiving unit 0224 receives and stores the print data 0203 from the print data supply device 0230 (FIG. 8 (7)). When the print data 0203 cannot be received because there is no print data in the print data supply device 0230, the print data receiving unit 0224 notifies the print instruction device that the following processes cannot be continued via the print instruction information receiving unit 0226. Furthermore, if necessary, it requests the communication path establishing unit 0222 to cut the secure communication path 240 established at the procedure (4).

Lastly, the print data receiving unit 0224 requests the printing unit 0225 to print the print data 0203 received and stored at the procedure (7), and the printing unit 0225 starts printing (FIG. 8 (8)). Here, the printing unit 0225 may have a system in which, when the printing of the print data 0203 is completed, it instructs the print instruction receiving unit 0221 to discard the print data position information 0201, the authentication information 0202, the print parameter and the like stored relating to the process, and the print instruction receiving unit 0221 discards such information. Consequently, the storage area of the print device 0220 can be used effectively. Further, when the information to be discarded is the authentication information 0202, a period of time in which the print device 0220 holds the authentication information 0202 can be minimized and security can be strengthened.

Here, in this example, the authentication information 0202 necessary for accessing the print data 0203 is different for each print data 0203, and the authentication information 202 at the procedure (2) is transferred for each print instruction at the procedure (1). However, one piece of authentication information 0202 can be used by a plurality of print instructions as in i) a print system in which the same authentication information 0202 can be used unless the authentication information 0202 differs for each print data supply device 0230 and the print data 0203 is in the same print data supply device 0230, and ii) a print system in which the same authentication information 0202 can be used for any piece of the print data 0203 in the print data supply device 0230 unless the authentication information 0202 is set respectively for each user and the print instruction is from the same user. In such case, it is possible to omit the above process of the procedure (2) of transferring the authentication information 0202 for each print instruction by setting a function (e.g. authentication information receiving unit which is not shown in the diagram) of receiving in advance and storing the authentication information 0202 into the print device 0220.

Specifically, an authentication information receiving unit is newly set in the print device 0220 so that the authentication information receiving unit receives and stores the authentication information 0202 from the print instruction device 0101 before the print instruction is performed.

The print instruction receiving unit 0221 receives the print instruction at the procedure (1), takes out the authentication information 0202 received in advance from the authentication information receiving unit and moves on to the process at the procedure (3).

Note that when there is no authentication information 0202 in the authentication information receiving unit, the print instruction receiving unit 0221 notifies the print instruction device 0210 that proper authentication information has not been transmitted.

Here, the plurality of pieces of authentication information can be stored in the authentication information receiving unit. In this case, the authentication information receiving unit receives, with the authentication information, identification information for specifying the authentication information used in the authentication information receiving unit every time when the authentication information receiving unit receives the authentication information. Further, in this case, after the plurality of pieces of authentication information is stored in the authentication information receiving unit, that is, after transmitting all of the plurality of pieces of authentication information to the print device, the print instruction device 0101 does not transmit the authentication information itself but only transmits the identification information for specifying the authentication information. Specifically, a field for describing the authentication information ID (e.g. a serial number of the authentication information etc.) is set for each piece of authentication information, and the authentication information receiving unit receives a plurality of pieces of authentication information to which the authentication information ID is attached. After that, the plurality of pieces of authentication information is once stored in the authentication information receiving unit. Then, the print instruction device 0210 transmits, instead of transmitting the authentication information to the print device 0220, only the authentication information (authentication information ID) for specifying the authentication information stored in the authentication information receiving unit.

When the print instruction is received by the print instruction receiving unit 0221, the identification information for specifying the authentication information necessary for accessing the print data 0203 is also received, the authentication information stored in the authentication information receiving unit is obtained based on the identification information, and the process moves on to the process (3). Note that, when the authentication information that can be specified from the identification information is not stored in the authentication information receiving unit, the print instruction receiving unit 0221 notifies the print instruction device 0210 about that.

In the above, the embodiment of the print device 0220 based on the basic sequence of the present invention is explained. However, the print instruction device 0210 only instructs printing by executing the procedures (1) and (2) so that the processing loads on the print instruction device 0210 can be reduced. Also, the print data 0203 is received mainly by the print device 0220 so that the print instruction device 0210 can also reduce the network loads because the print instruction device 0210 does not need to bridge the print data 0203. In addition, the print data 0203 is data transferred through the secure communication path 0240 established between the print device 0220 and the print data supply device 0230 via the communication path 0240 so that the print data 0203 can be protected.

<Embodiment of Print Device in Print Instruction Information Push Sequence>

A specific behavior of the print device in the print instruction information push sequence is explained with reference to FIG. 9. Similar to the configuration in FIG. 8, a print device 0220 a connected to a print instruction device 0210 and a print data supply device 0230 through a communication path.

As an internal configuration of the print device 0220, it is the same as that in FIG. 8 except that the print instruction receiving unit 0221 in FIG. 8 is changed to a print instruction information receiving unit 0226.

The print instruction information receiving unit 0226 has a function of receiving print instruction information 0204 sent from the print instruction device 0210 and a function of understanding the contents of the information and taking out the print data position information 0201 and the authentication information 0202. Furthermore, in the present embodiment, the print instruction information receiving unit 0226 has a function of storing the information such as the print data position information 0201 and the authentication information 0202 that are taken out from the print instruction information 0204. However, it may set a unit for storing (storage unit) information according to another print instruction.

Figure 9:
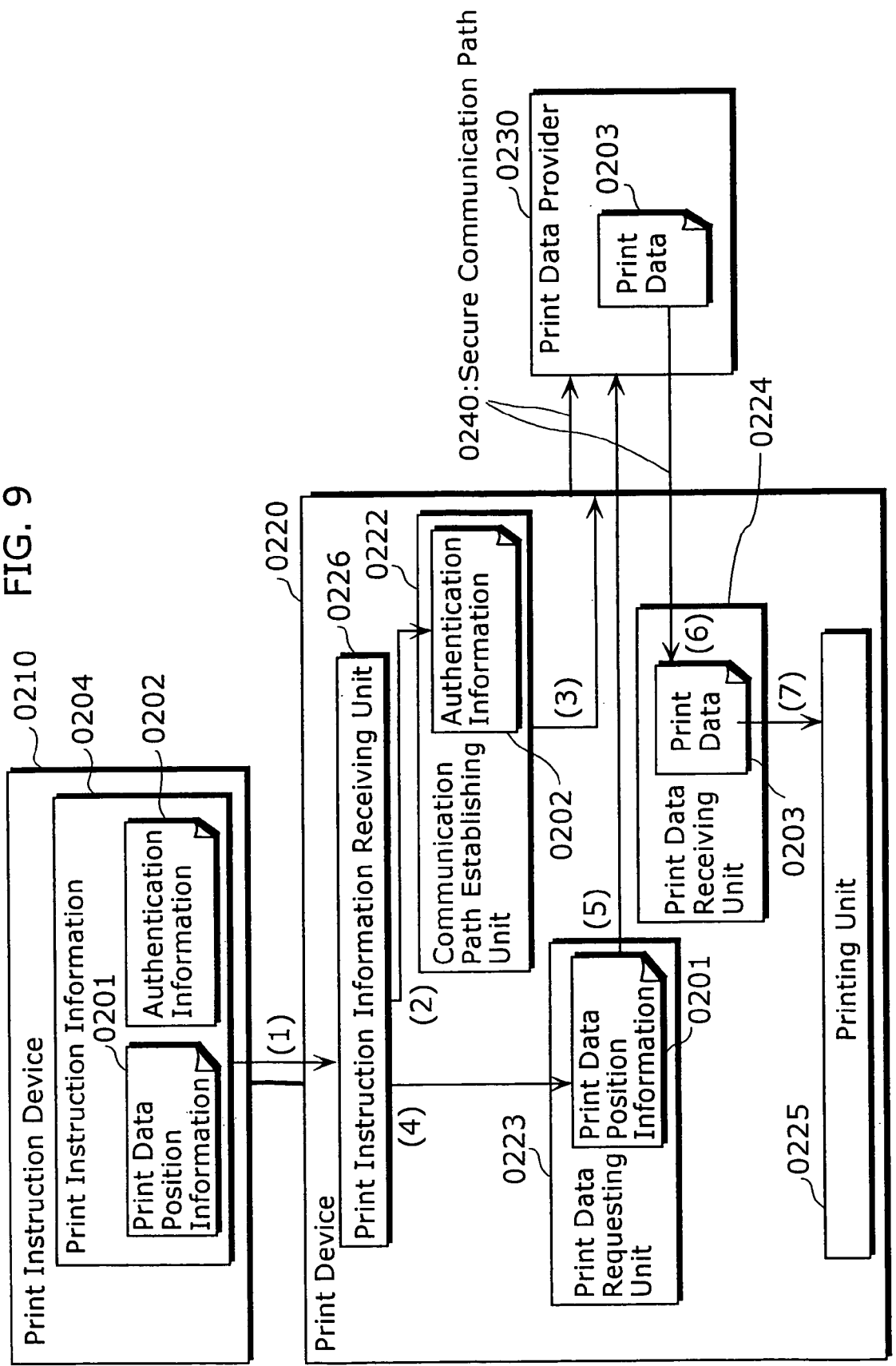
FIG. 9 is a diagram showing an internal sequence of the print device in the print instruction information push sequence shown in FIG. 6.

Whereas it is not shown in FIG. 9, when the print instruction information 0204 includes a printing parameter, the print instruction information receiving unit 0226 takes and stores the contents of the parameter. While it is also not shown in the diagram, the printing parameter may be received and stored separately at the print instruction information receiving unit 0226. Note that it is needless to say that a unit (processing unit) having a function of receiving a parameter can be newly set. The printing parameter stored in the print instruction information receiving unit 0226 is notified to the printing unit 0225 and reflected for the printing at the printing unit 0225.

Hereafter specific flow of processes is explained with reference to FIG. 9.

First, the print device 0220 starts the process at a moment when the print instruction information 0204 is received at the print instruction information unit 0226 (FIG. 8 (1)).

The print instruction information receiving unit 0226 understands the print instruction information 0204, obtains and stores the print data position information 0201 and the authentication information 0202.

The processes after the procedure (2) are same as the processes after the procedure (3) shown in FIG. 8 except that the print instruction information receiving unit 0226 performs the same processes as the print instruction receiving unit 0221 shown in FIG. 8 so that the same explanation is omitted.

Here, if necessary, a printing completion notifying unit (not shown in the diagram) which notifies the print instruction device 0210 of a completion of printing is further set in the print device 0220, and the printing completion notifying unit may notify the printing completion when receiving data from the print data supply device 0230 is necessary.

In the above, the embodiment of the print device in the print instruction information push sequence is explained. However, in addition to a benefit described for "the embodiment of the print device based on the basic sequence", the print device in the present information receives the print data position information 0201 and the authentication information 0202 as the print instruction information 0204 at once so that it has benefits that the print device can easily associate the print data position information 0201 with the authentication information 0202, and that it can reduce the communication traffic between the print instruction device 0210 and the print device 0220.

<Embodiment of Implemented Print Device in Print Instruction Information Pull Sequence>

A specific behavior of the print device in the print instruction information pull sequence is explained with reference to FIG. 10. A configuration of a print device 0220 in FIG. 10 includes a print instruction information position receiving unit 0227 and a print instruction information requesting unit 0228 in addition to the configuration of the print device 0220 shown in FIG. 9. Other configuration elements are the same as those in the print device 0220 shown in FIG. 9.

The print instruction information position receiving unit 0227 has a function of receiving position information of the print instruction information 0204 from the print instruction device 0210. Note that the position information of the print instruction information 0204 is information for specifying a position (place) in which the print instruction information 0204 is stored, which differs from the print data position information 0201. The position information of the print instruction information 0204 can be, for example, an address of a memory in the print instruction device 0210, a URL or the like. Here, according to an example, in "the embodiment of the print device in the print instruction information push sequence", the print instruction information receiving unit 0226 has a function of receiving the print parameter from the print instruction device 0210 and notifying to the printing unit 0225. However, the print instruction information position receiving unit 0227 may have this function.

The print instruction information requesting unit 0228 has a function of requesting a device which holds the print instruction information 0204 of the print instruction information 0204 based on the position information notified from the print instruction information position receiving unit 0227.

Hereafter, a specific flow of processes of the print device 0220 in the print instruction information pull sequence is explained with reference to FIG. 10.

Figure 10:
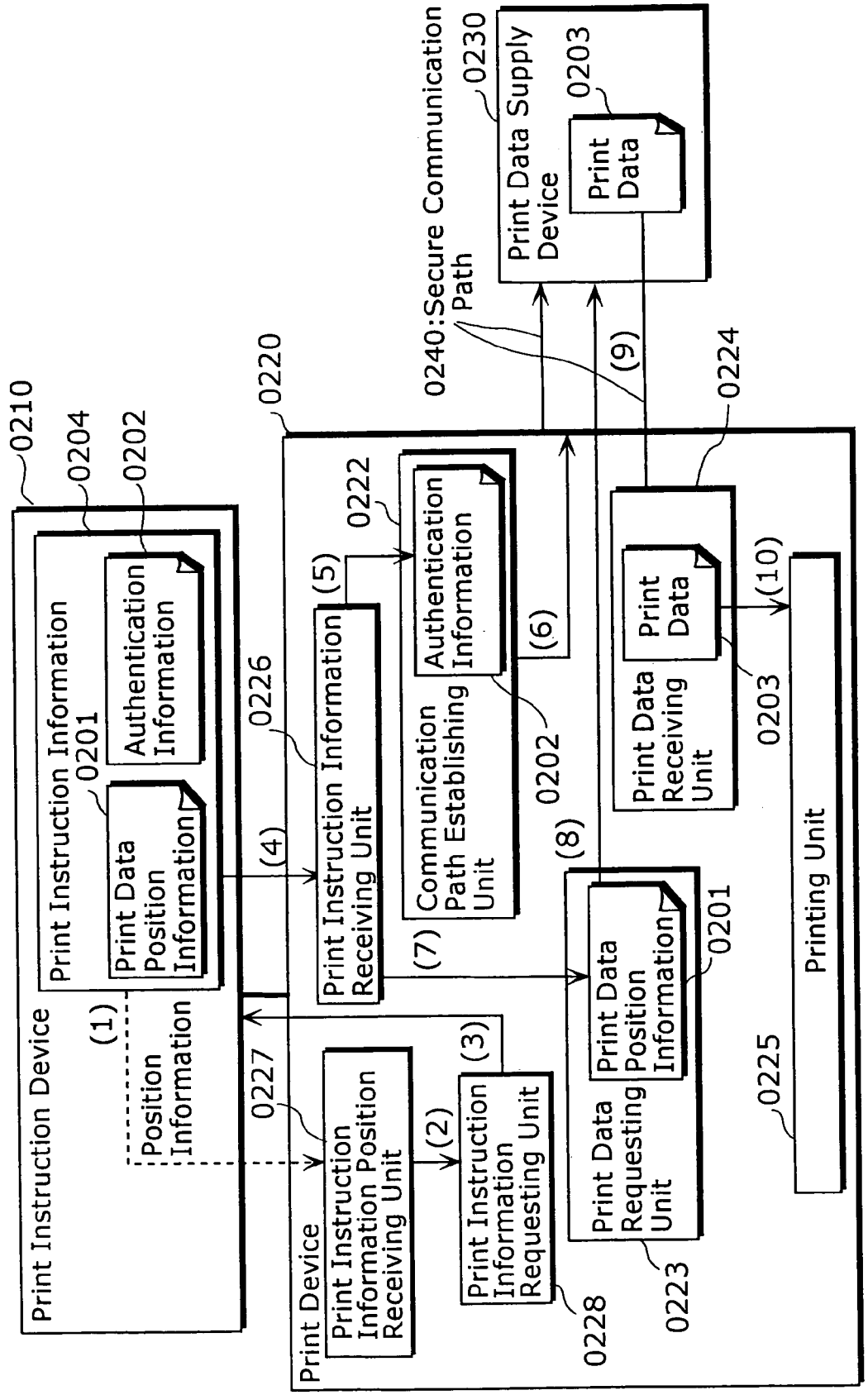
FIG. 10 is a diagram showing an internal sequence diagram of the print device in the print instruction information pull sequence shown in FIG. 7.

The print device 0220 starts the process at a moment when the position information of the print instruction information 0204 is received in the print instruction information position receiving unit 0227 (FIG. 10 (1)).

The print instruction information position receiving unit 0227 receives the position information of the print instruction information 0204, notifies the print instruction information requesting unit 0204 of the position information, and requests the print instruction information 0204 that can be specified in the position information (FIG. 10 (2)).

The print instruction information requesting unit 0228 which received the request specifies a device (print instruction device 0210 in FIG. 10) which holds the print instruction information 0204 from the position information of the print instruction information 0204 and requests to transmit the print instruction information 0204 (FIG. 10 (3)).

The processes after the procedure (4) are the same as the processes after the procedure (1) shown in FIG. 9, and thus, the same explanation is omitted.

Note that FIG. 10 shows an example in which a device which notifies the print device 0220 of the position information of the print instruction information 0204 and a device which transmits the print instruction information 0204 itself to the print device 0220 are the same device (both are print instruction device 0210). However, the present invention is not limited to this example so that the device which notifies the print device 0220 of the position information of the print instruction information 0204 (FIG. 1 (1)) and the device which transmits the print instruction information 0204 to the print device 0220 (that is, a device which performs transmission at FIG. 10 (4) in response to the request at FIG. 10 (1)) can be different devices.

Also, if necessary, a print instruction completion notifying unit (not shown in the diagram) which notifies the print instruction device 0210 of the reception of the print instruction information 0204 is further set, and the print instruction completion notifying unit may notify a completion of the print instruction after a point when the print instruction information 0204 becomes unnecessary.

Similarly, if necessary, a print completion notifying unit (not shown in the diagram) which notifies the print instruction device 0210 of a completion of printing is further set in the print device 0220, and the print completion notifying unit may notify the print completion after a point when it is not necessary to receive a print data from the print data supply device 0230.

In the above, the embodiment of the print device in the print instruction information pull sequence is explained. The print device in the present embodiment also has the same benefits as those in "the embodiment of the print device based on the basic sequence" and "the embodiment of the print device in the print instruction information pull sequence". In addition, the print device in the present embodiment can sequentially receive a necessary portion of the print instruction information 0204 based on the position information of the print instruction information 0204. Accordingly, it has a benefit that it can use effectively the memory resource in the print device 0220.

Also, in the above, three embodiments of the embodiment of the print device in the basic sequence; the embodiment of the implemented print device in the print instruction information push sequence; and the embodiment of the implemented print device in the print instruction information pull sequence are explained.

Here, in the three embodiments, an example of receiving one piece of print data in common is explained. However, a plurality of pieces of print data may be received. In this case, the position information of the plurality of print data 0203 is described in the print data position information 0201. The procedures of (6) to (8) in FIG. 8, (5) to (7) in FIG. 9, and (8) to (11) in FIG. 10 are repeatedly executed every time when the next print data 0203 is needed in the printing unit 0225. The print device 0220 then receives the plurality of pieces of print data 0203 through the secure communication path 0240.

Furthermore, a link to other data from print data 0203 is further established. When the linked data is also necessary for executing printing in the printing unit 0225, similarly, the procedures (6) to (8) in FIG. 8, (5) to (7) in FIG. 9, and (8) to (10) in FIG. 10 are performed and the print device 0220 receives the linked data from the print data 0203 through the secure communication path 0240. It is explained in detail with reference to FIG. 11 based on the embodiment of the print device in the print instruction information pull sequence.

Figure 11:
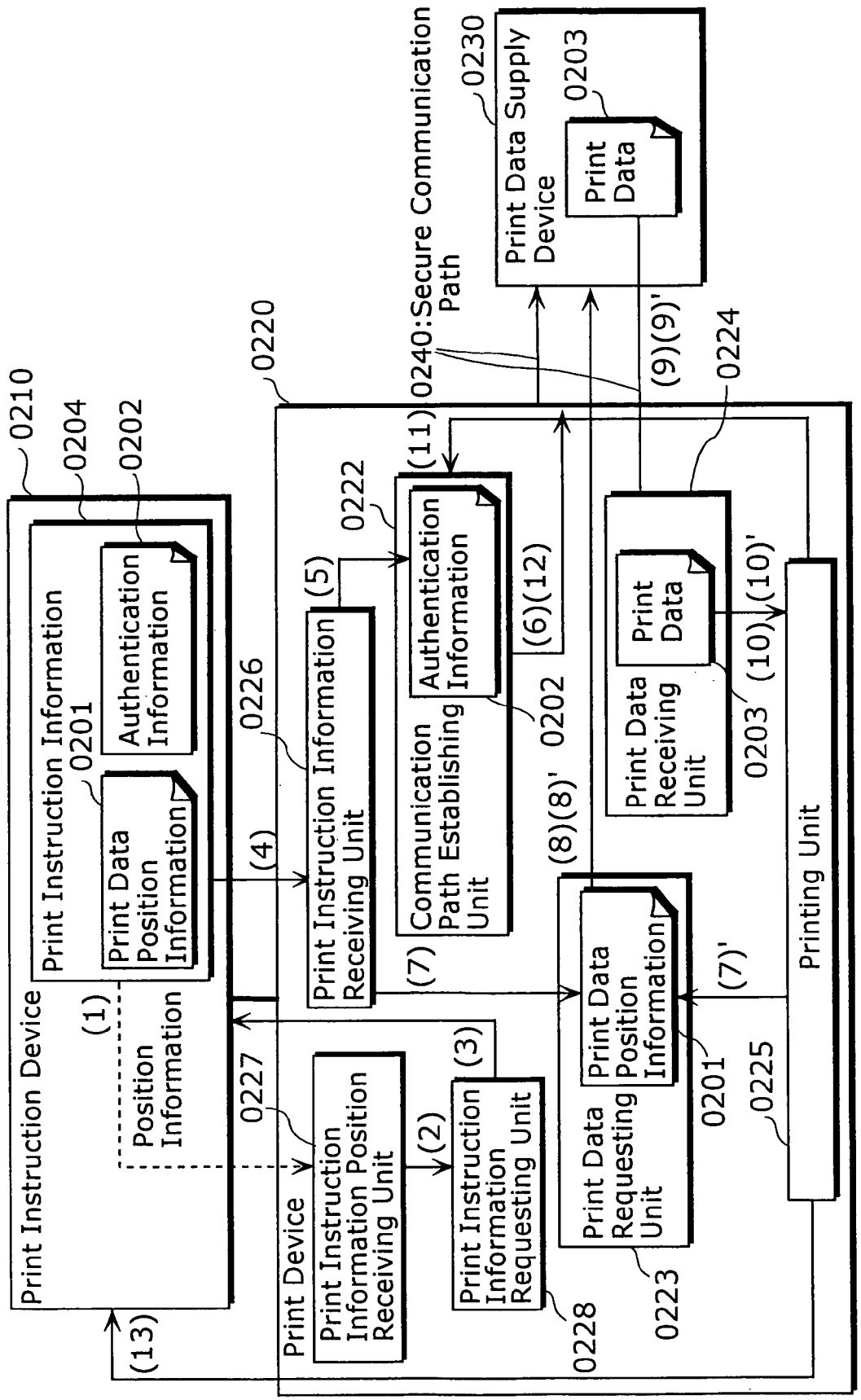
FIG. 11 is a diagram showing an internal sequence of the print device in the case where the print device needs to receive a plurality of pieces of print data using FIG. 10 as an example.

In FIG. 11, sequences (7)', (8)', (9)', and (10)' for receiving the linked data from the print data 0203 are further added to the sequence shown in FIG. 10. Furthermore, new sequences (11), (12), and (13) for notifying the print instruction device 0210 of the end of printing are added.

Hereafter, a flow of specific processes in the case where the linked data is received from the print data 0203 after receiving the print data 0203 is explained with reference to FIG. 11.

The procedures from (1) to (10) are same as the procedures shown in FIG. 10 so that the same explanation is omitted.

After the procedure (10) and in the process of printing the print data 0203 in the printing unit 0225, it is assumed that a link to other data (referred to as data B) is found in the print data 0203 (referred to as data A). When the data B is necessary for continuing printing, the printing unit 0225 obtains the position information of the data B from the data B written in the data A and notifies the print data requesting unit 0223 of the position information of the data B (FIG. 11 (7)').

The print data requesting unit 0223 which received the position information of the data B requests the print data supply device 0230 to transmit the data B through the secure communication path 0240 established at the procedure (6) (FIG. 11 (8)').

After finishing the processes up to the procedure (8), the print data receiving unit 0224 receives the data B from the print data supply device 0230 (FIG. 11 (9)') and transmits the data to the printing unit 0225 (FIG. 11 (10)').

When the link to other data is found during the printing in the printing unit 0225, in sequence, the procedures (7)' to (10)' are performed and the necessary data is received. Note that in the case where the desired data does not exist in the print data supply device 0230, the printing unit 0225 notifies the print instruction device 0210 that the printing cannot be continued in the printing unit 0225.

During the printing in the printing unit 0225, when the data does not need to be received from the external device, the printing unit 0225 requests the communication path establishing unit 0222 to cut the secure communication path 0240 established at the procedure (6) (FIG. 11 (11)).

The communication path establishing unit 0222 which received the request cuts the secure communication path 0240 established between the print device 0220 and the print data supply device 0230 (FIG. 11 (12)).

When the printing is completed in the print device 0225, the printing unit 0225 notifies the print instruction device 0210 that the printing is completed (FIG. 11 (13)). Note that this procedure (13) is determined to be performed after the printing is completed and after the secure communication path is cut at the procedure (12) so that the print instruction device 0210 can know that the secure communication path 0240 between the print device 0220 and the print data supply device 0230 has been cut and that the printing in the print device 0220 has been completed.

Further, an example is explained, in three embodiments relating to the print device 0220, that the print instruction device 0210 and the print device 0220 are connected through the communication path. However, it can be a mechanism in which the print instruction device 0210 and the print device 0220 are not connected through the communication path and the data is transmitted and received via a memory card such as a SD card and a compact flash (R). In this case, the print instruction device 0210 stores the print data position information 0210 and the authentication information 0202 or the print instruction information 0204 into the memory card medium and performs print instruction by inserting them into the print device 0220 by a user. Specifically, the print instruction receiving unit 0221 in FIG. 8 or in the print instruction information receiving unit 0226 in FIG. 9 and FIG. 10 detects an insertion of the memory card and performs processes by recognizing that the print instruction is received if the print data position information 0201 and the authentication information 0202 or the print instruction information 0204 are stored in the inserted memory card. The behavior after the print data position information 0201 and the authentication information or the print instruction information 0204 are received is the same as that of the embodiment described above, the procedures after the procedure (3) in FIG. 8, the procedures after the procedure (2) in FIG. 9 or the procedures after the procedure (5) in FIG. 10 are executed and the printing is performed.

In the case where the print device 0220 needs to protect the data received from an external device (the print instruction device 0210 in the present embodiment) such as the authentication information 0202 in the embodiment of the print device 0220 in the basic sequence and the print instruction information 0204 in the embodiment of the implemented print device in the print instruction information push sequence and in the embodiment of the implemented print device in the print instruction information pull sequence, a secure communication path is established in advance between the external device and the print device led by the external device, and the print device receives the data which needs the protection through the communication path.

Here, the IEEE 1394 has a data transfer connection called an Asynchronous Connection to which large capacity data such as print data which does not require the real time is transferred. There is no data protection function in the Asynchronous Connection. Therefore, a development of a Digital Transmission Content Protection (DTCP) for the Asynchronous Connection has been developed recently. Accordingly, in the embodiments of the print device 0220 shown in FIG. 8, FIG. 9, FIG. 10 and FIG. 11, when the communication path between the print instruction device 0210 and the print device 0220 is the IEEE 1394, the print instruction device 0210 establishes in advance a (secure) Asynchronous Connection with a data protection function by the DTCP between the print instruction device 0210 and the print device 0220 and transmits data such as the authentication information 0202 and the print instruction information 0204 via the Asynchronous Connection. On the other hand, in the IEEE 1394, a mechanism of protecting the control command does not exist and the standardization is neither encouraged so that an issuing of the control command from the print instruction device 0210 to the print device 0220 is performed in a state without protection (insecure).

INDUSTRIAL APPLICABILITY

The print system according to the present invention is useful as a print system for receiving directly and printing print data associated with an image such as broadcasting content from the Internet through a public network and a communication cable, a distribution system for print data by CATV and the like.

In addition, the print instruction device according to the present invention is useful as a DTV, a cellular phone, a personal computer and the like which receive and display an image from the broadcasting system, the Internet via the public network and the communication table, the distribution system of the image by the CATV and the like, and output a print instruction of the print data associated with the displayed image to the print device.

Further, the print device according to the present invention is useful as a print device and the like which receives and prints the print data associated with the image by the Internet and the CATV through the public network and the communication cable from the distribution system and the like.

The invention claimed is:

1. A print system for printing print data provided from a print data supply device to a registered user or device that is authorized to access print data, said print system comprising:

a print instruction device; and a print device;

wherein said print instruction device includes a print instruction unit operable to transmit, to said print device, a print instruction to print the print data in the print data supply device, with authentication information given only to the registered user or device; and wherein said print device includes a data requesting unit and a data receiving unit;

wherein said data requesting unit is operable to transmit the authentication information with the print instruction to the print data supply device and request the print data supply device to transmit the print data;

wherein said data receiving unit is operable to receive the requested print data from the print data supply device;

wherein said print instruction unit includes a print instruction generating unit, a print instruction information transmitting unit, and a print instruction information storing unit;

wherein said print instruction information generating unit is operable to generate print instruction information that is obtained by integrating print data position information indicating a storage location of the print data with the authentication information;

wherein said print instruction information transmitting unit is operable to transmit the print instruction information to said print device;

wherein said data requesting unit is operable to i) extract the print data position information and the authentication information from the print instruction information and ii) request a transmission of the print data indicated in the print data position information;

wherein said print instruction information storing unit is operable to store the generated print instruction information into a memory card medium connected to said print instruction device;

wherein said data requesting unit includes a print instruction information reading unit operable to read the print instruction information from the memory card medium connected to said print device; and wherein said data requesting unit is operable to extract the print data position information and the authentication information from the read print instruction information.

2. A print system for printing print data provided from a print data supply device to a registered user or device that is authorized to access print data, said print system comprising:

a print instruction device; and a print device;

wherein said print instruction device includes a print instruction unit operable to transmit, to said print device, a print instruction to print the print data in the print data supply device, with authentication information given only to the registered user or device;

wherein said print device includes a data requesting unit, a data receiving unit, and an authentication information storing unit;

wherein said data requesting unit is operable to transmit the authentication information with the print instruction to the print data supply device and request the print data supply device to transmit the print data;

wherein said data receiving unit is operable to receive the requested print data from the print data supply device;

wherein the authentication information includes identification information for identifying the authentication information;

wherein said print instruction unit includes an authentication information transmission history storing unit, and a transmission history judging unit;

wherein said authentication information transmission history storing unit is operable to store a history of authentication information transmitted to said print device;

wherein said transmission history judging unit is operable to judge whether or not authentication information to be transmitted to said print device has been transmitted to said print, device;

wherein said print instruction device is operable, when said transmission history judging unit judges that the authentication information has been transmitted to said print device, to transmit the print instruction with the identification information instead of the authentication information;

wherein said authentication information storing unit is operable to keep storing the received authentication information even after the print data has been printed; and wherein said data requesting unit is operable to read the authentication information specified by the received identification information from said authentication information storing unit and transmit the authentication information to the print data supply device.

3. The print system according to claim 2, wherein said data receiving unit is operable to establish an encrypted communication path between said print device and the print data supply device using the authentication information and receive the print data through the encrypted communication path.

4. The print system according to claim 2, wherein the authentication information includes a decryption key which is data for decrypting the encrypted print data.

5. The print system according to claim 2, wherein said data receiving unit includes:

an encrypted data receiving unit operable to receive the encrypted print data; and a print data decrypting unit operable to decrypt the received print data using the authentication information.

6. The print system according to claim 2, wherein the authentication information includes information for identifying said print instruction device or information for identifying the user of said print system.

7. The print system according to claim 6, wherein the authentication information is a pair of an identification (ID) of the print instruction device or an ID of the user of the print system, with a password.

8. The print system according to claim 7, wherein the authentication information is described in the print data position information.

9. The print system according to claim 7,
wherein the authentication information includes a public key of a certificate authority for verifying a public key certificate of the print data supply device;
wherein said encrypted communication path establishing unit is operable, while verifying that the print data supply device is an authorized access destination using the public key of the certificate authority, to establish a Secure Socket Layer (SSL) or a Transport Layer Security (TLS) between the print data supply device and said print device; and
wherein said data transmitting unit is operable to transmit the requested print data to said print device through the SSL or the TLS.

10. The print system according to claim 6,
wherein said data requesting unit is operable to discard the authentication information after said data receiving unit has received the print data.

11. The print system according to claim 6, further comprising the print data supply device including:
a request receiving unit operable to receive a request of a transmission of print data and authentication information corresponding to the print data;
a user identifying unit operable to identify said print instruction device or the user using the received authentication information;
an authenticating unit operable to authenticate whether or not the identified print instruction device or the user is authorized to access the requested print data; and
a data transmitting unit operable to transmit the requested print data to said print device if the access is permitted as the result of the authentication.

12. The print system according to claim 11,
wherein said print instruction device is operable to have a communication session with said print data supply device and obtain an authentication from said authenticating unit before instructing the printing,
the authentication information is communication session information issued to said print instruction device from said print data supply device in the communication session, and
the communication session information includes information indicating that said print instruction device or the user has been authorized to access the print data.

13. The print system according to claim 12,
wherein said print instruction unit includes a communication session information storing unit operable to store the communication session information issued from said print data supply device through a communication path established in advance between said print data supply device and said print instruction device;
wherein said print instruction device is operable to transmit the print instruction by attaching the communication session information as the authentication information;
wherein said data requesting unit is operable to transmit the authentication information to said print data supply device and request a transmission of the print data; and
wherein said print data supply device is operable to receive the authentication information that is the communication session information, skip processes in said user identifying unit and said authenticating unit and transmit the requested print data to said print device.

14. The print system according to claim 13,
wherein the communication session information is a Cookie issued to said print instruction device by said print data supply device.

15. The print system according to claim 11,
wherein the authentication information further includes a public key of a certificate authority for verifying a public key certificate of the print data supply device.

16. The print system according to claim 2, further comprising the print data supply device; and
wherein said print instruction device and said print data supply device are included in a same device.

17. The print system according to claim 2,
wherein said print instruction device and said print device are connected to each other by wireless communication.

* * * * *